US012664223B2

(12) United States Patent
Holland et al.

(10) Patent No.: US 12,664,223 B2
(45) Date of Patent: Jun. 23, 2026

(54) CONTENT ADAPTATION SYSTEM

(71) Applicant: QUALCOMM Incorporated, San Diego, CA (US)

(72) Inventors: Wesley James Holland, Encinitas, CA (US); Ziad Asghar, San Diego, CA (US); Seyfullah Halit Oguz, San Diego, CA (US); Daniel Jared Sinder, San Diego, CA (US); Vikram Gupta, San Diego, CA (US); Khaled Helmi El-Maleh, San Marcos, CA (US); Vinesh Sukumar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 18/447,858

(22) Filed: Aug. 10, 2023

(65) Prior Publication Data

US 2025/0054212 A1 Feb. 13, 2025

(51) Int. Cl.
*G06T 11/60* (2026.01)
*G06F 3/01* (2006.01)
*G06V 10/75* (2022.01)
*G06V 40/16* (2022.01)

(52) U.S. Cl.
CPC .............. *G06T 11/60* (2013.01); *G06F 3/013* (2013.01); *G06V 10/758* (2022.01); *G06V 40/174* (2022.01)

(58) Field of Classification Search
CPC .................................................... G06T 11/60
See application file for complete search history.

(56) References Cited

U.S. PATENT DOCUMENTS

| | | | |
|---|---|---|---|
| 10,776,412 B2 | 9/2020 | Roy et al. | |
| 2015/0099255 A1 | 4/2015 | Aslan et al. | |
| 2020/0021888 A1* | 1/2020 | de Mello Brandao | ...................... H04N 21/8456 |
| 2021/0182697 A1* | 6/2021 | Singh ..................... G06F 16/258 | |
| 2023/0080407 A1* | 3/2023 | Kumar .................. G06F 40/166 | 715/717 |

OTHER PUBLICATIONS

International Search Report and Written Opinion—PCT/US2024/040985—ISA/EPO—Nov. 12, 2024.

* cited by examiner

*Primary Examiner* — Shivang I Patel
(74) *Attorney, Agent, or Firm* — QUALCOMM Incorporated

(57) ABSTRACT

Systems and techniques are provided for adapting digital content. For example, a process can include obtaining a digital content comprising a default configuration for outputting the digital content to a device; outputting, by the device, the digital content based on the default configuration for outputting the digital content. The process can include obtaining, from a monitoring engine, content interaction information associated with outputting, by the device, the digital content based on the default configuration for outputting the digital content. The monitoring engine is configured to monitor one or more interactions between one or more users of the device and the digital content. The process can include generating, based on the content interaction information, a content adaptation for the digital content. The process can include outputting, by the device, the content adaptation for the digital content.

30 Claims, 10 Drawing Sheets

WIDGETZOOMTECH DETAILS

410

DETAILED METRICS

420

| Business Content A | Business Content B |
|---|---|
| ; ; | ; ; |
| ; ; | ; ; |
| ; ; | ; ; |
| ; ; | ; ; |

| Business Content C | Business Content D |
|---|---|
| ; ; | ; ; |
| ; ; | ; ; |
| ; ; | ; ; |
| ; ; | ; ; |

| Business Content E | Business Content F |
|---|---|
| ; ; | ; ; |
| ; ; | ; ; |
| ; ; | ; ; |
| ; ; | ; ; |

| Business Content G | Business Content H |
|---|---|
| ; ; | ; ; |
| ; ; | ; ; |
| ; ; | ; ; |
| ; ; | ; ; |

| Business Content I | Business Content J |
|---|---|
| ; ; | ; ; |
| ; ; | ; ; |
| ; ; | ; ; |
| ; ; | ; ; |

| Business Content K | Business Content L |
|---|---|
| ; ; | ; ; |
| ; ; | ; ; |
| ; ; | ; ; |
| ; ; | ; ; |

FIG. 4B

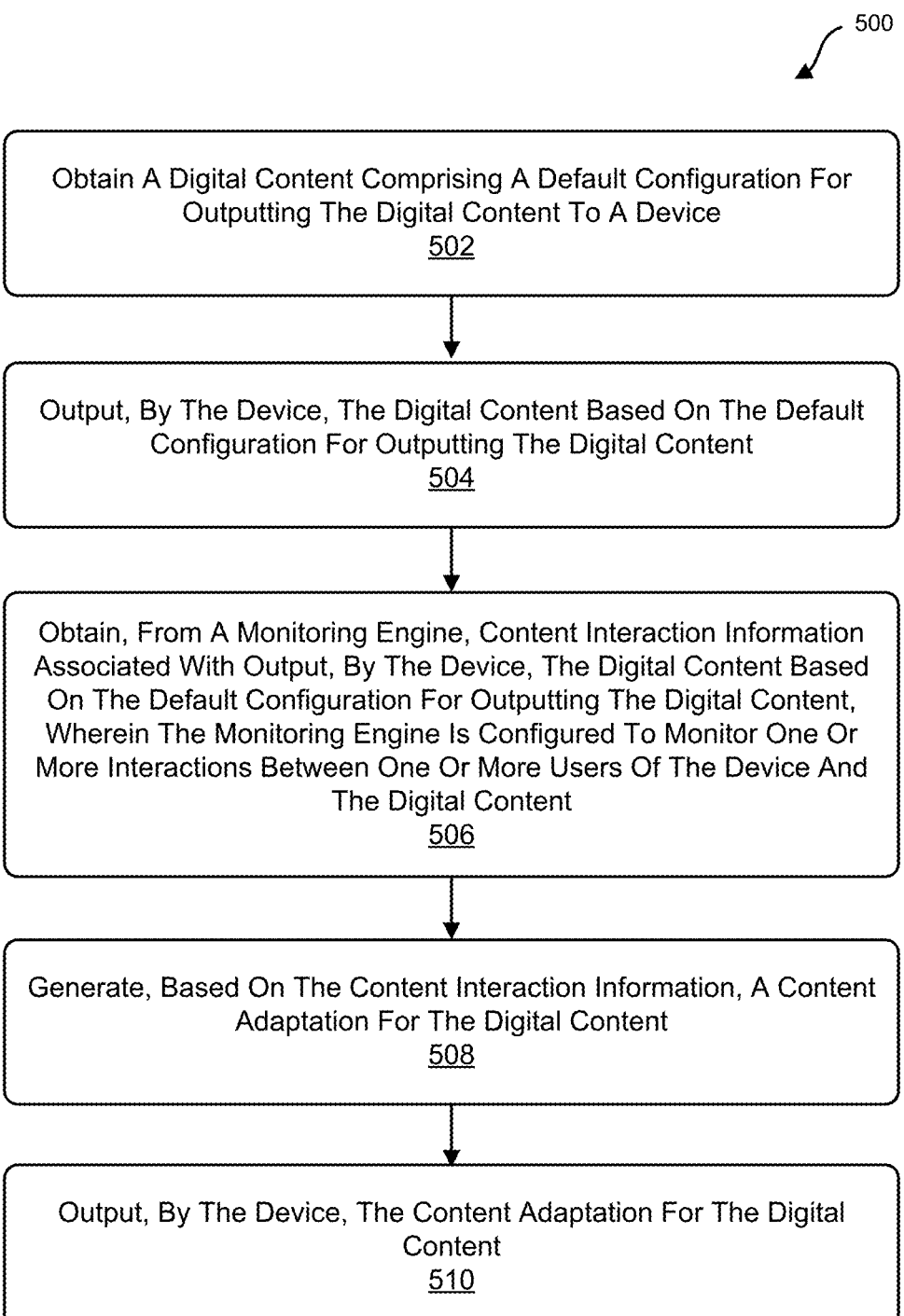

500

Obtain A Digital Content Comprising A Default Configuration For Outputting The Digital Content To A Device
502

Output, By The Device, The Digital Content Based On The Default Configuration For Outputting The Digital Content
504

Obtain, From A Monitoring Engine, Content Interaction Information Associated With Output, By The Device, The Digital Content Based On The Default Configuration For Outputting The Digital Content, Wherein The Monitoring Engine Is Configured To Monitor One Or More Interactions Between One Or More Users Of The Device And The Digital Content
506

Generate, Based On The Content Interaction Information, A Content Adaptation For The Digital Content
508

Output, By The Device, The Content Adaptation For The Digital Content
510

FIG. 5

CONTENT ADAPTATION SYSTEM

FIELD

The present disclosure is related to content adaptation. For example, aspects of the present disclosure are related to systems and techniques for providing content adaptation of digital content provided to multiple consumers of the digital content.

BACKGROUND

Content may be generated to inform, educate, or entertain a plurality of users. However, consuming users may have different learning styles, physical states, and/or preferences that can result in static content being suboptimal for some users. In some cases, users may be provided with a limited ability to adjust the presentation of the content. However, available adjustments may not be capable of providing the desired experience for some users.

Machine learning models (e.g., deep learning models such as neural networks) can be used to perform a variety of tasks, including natural language processing (NLP), image processing, audio processing, depth estimation, detection and/or recognition (e.g., scene or object detection and/or recognition), pose estimation, image reconstruction, classification, three-dimensional (3D) modeling, dense regression tasks, data compression and/or decompression, image processing, among other tasks. Machine learning models can be versatile and can achieve high quality results in a variety of tasks, other vehicles, objects, and/or obstacles in proximity to the vehicle, among others.

BRIEF SUMMARY

In some examples, systems and techniques are described for providing digital content adaptation. According to at least one example, a method is provided for adapting digital content. The method includes: obtaining a digital content comprising a default configuration for outputting the digital content to a device; outputting, by the device, the digital content based on the default configuration for outputting the digital content; obtaining, from a monitoring engine, content interaction information associated with outputting, by the device, the digital content based on the default configuration for outputting the digital content, wherein the monitoring engine is configured to monitor one or more interactions between one or more users of the device and the digital content; generating, based on the content interaction information, a content adaptation for the digital content; and outputting, by the device, the content adaptation for the digital content.

In another example, an apparatus for adapting digital content is provided that includes at least one memory and at least one processor coupled to the at least one memory. The at least one processor is configured to: obtain a digital content comprising a default configuration for outputting the digital content to a device; outputting, by the device, the digital content based on the default configuration for outputting the digital content; obtaining, from a monitoring engine, content interaction information associated with outputting, by the device, the digital content based on the default configuration for outputting the digital content, wherein the monitoring engine is configured to monitor one or more interactions between one or more users of the device and the digital content; generating, based on the content interaction information, a content adaptation for the digital content; and outputting, by the device, the content adaptation for the digital content.

In another example, a non-transitory computer-readable medium is provided that has stored thereon instructions that, when executed by one or more processors, cause the one or more processors to: obtain a digital content comprising a default configuration for outputting the digital content to a device; outputting, by the device, the digital content based on the default configuration for outputting the digital content; obtaining, from a monitoring engine, content interaction information associated with outputting, by the device, the digital content based on the default configuration for outputting the digital content, wherein the monitoring engine is configured to monitor one or more interactions between one or more users of the device and the digital content; generating, based on the content interaction information, a content adaptation for the digital content; and outputting, by the device, the content adaptation for the digital content.

In another example, an apparatus for adapting digital content is provided. The apparatus includes: means for obtaining a digital content comprising a default configuration for outputting the digital content to a device; means for outputting, by the device, the digital content based on the default configuration for outputting the digital content; means for obtaining, from a monitoring engine, content interaction information associated with outputting, by the device, the digital content based on the default configuration for outputting the digital content, wherein the monitoring engine is configured to monitor one or more interactions between one or more users of the device and the digital content; means for generating, based on the content interaction information, a content adaptation for the digital content; and means for outputting, by the device, the content adaptation for the digital content.

In some examples, systems and techniques are described for coordinating digital content adaptation. According to at least one example, a method is provided for coordinating content adaptations. The method includes: obtaining, by an aggregate adaptation engine, from a device, first content interaction information; comparing the first content interaction information and a second content interaction information, wherein the second content interaction information is obtained from one or more additional devices, different from the device; and outputting, basing on comparing the first content interaction information and the second content interaction information, a content adaptation to the device.

In another example, an apparatus for coordinating content adaptations is provided that includes at least one memory and at least one processor coupled to the at least one memory. The at least one processor is configured to: obtain, by an aggregate adaptation engine, from a device, first content interaction information; compare the first content interaction information and a second content interaction information, wherein the second content interaction information is obtained from one or more additional devices, different from the device; and output, based on comparing the first content interaction information and the second content interaction information, a content adaptation to the device.

In another example, a non-transitory computer-readable medium is provided that has stored thereon instructions that, when executed by one or more processors, cause the one or more processors to: obtain, by an aggregate adaptation engine, from a device, first content interaction information; compare the first content interaction information and a second content interaction information, wherein the second content interaction information is obtained from one or more additional devices, different from the device; and output, based on comparing the first content interaction information and the second content interaction information, a content adaptation to the device.

In another example, an apparatus for coordinating content adaptations is provided. The apparatus includes: means for obtaining, by an aggregate adaptation engine, from a device, first content interaction information; means for comparing the first content interaction information and a second content interaction information, wherein the second content interaction information is obtained from one or more additional devices, different from the device; and means for outputting, basing on comparing the first content interaction information and the second content interaction information, a content adaptation to the device.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 4A through FIG. 4C illustrate example content adaptations to the example content of FIG. 3, in accordance with some examples of the present disclosure;

FIG. 5 is a flow diagram illustrating an example of a process for content adaptation, in accordance with some examples;

DETAILED DESCRIPTION

Figure 1:
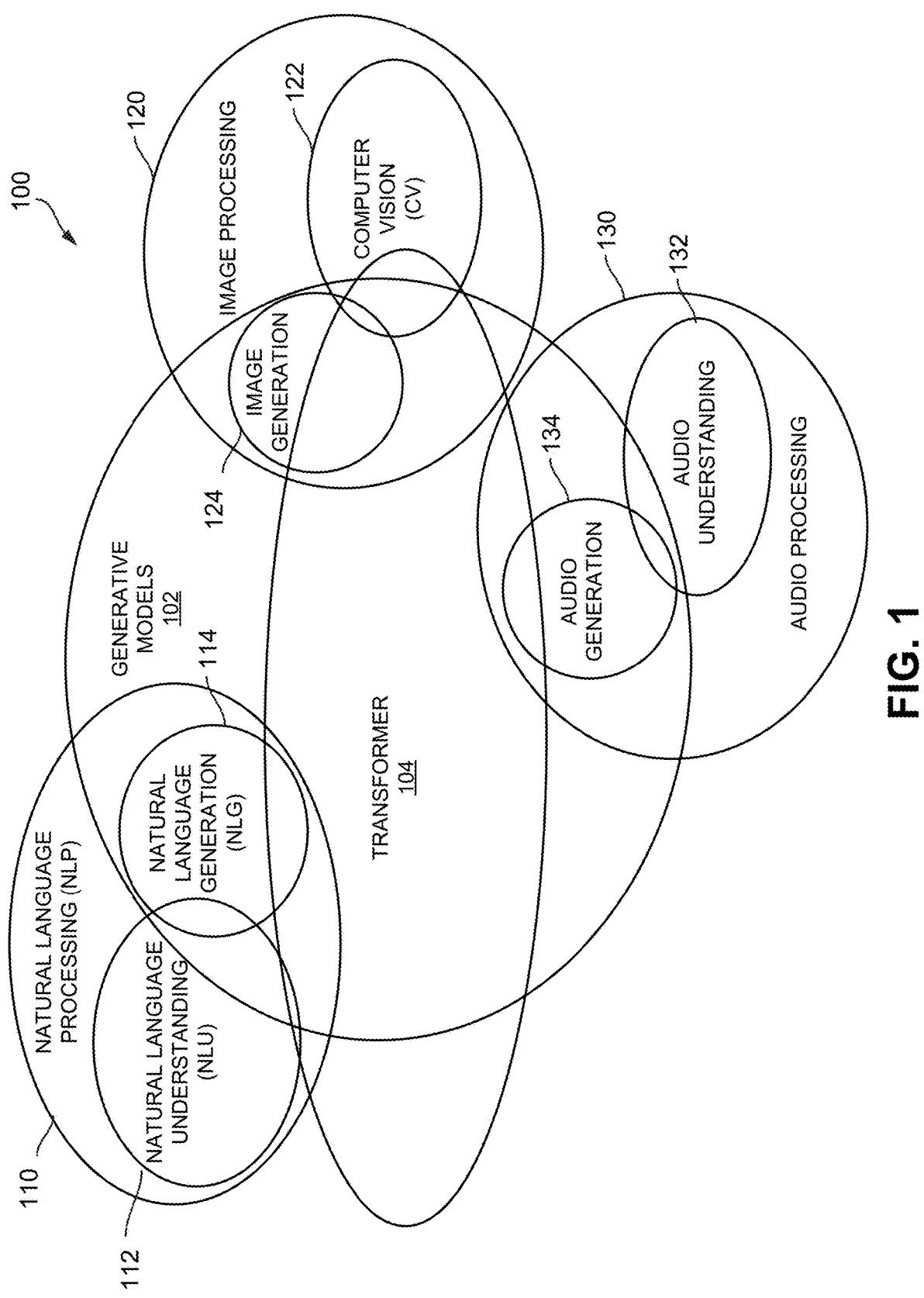
FIG. 1 is a diagram illustrating example relationships between machine learning tasks and various categories of neutral networks, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. As used herein, the terms XR system and XR device are used interchangeably. Examples of XR systems or devices include head-mounted displays (HMDs), smart glasses, among others. In some cases, an XR system can track parts of the user (e.g., a hand and/or fingertips of a user) to allow the user to interact with items of virtual content.

Machine learning systems (e.g., deep neural network systems or models) can be used to perform a variety of tasks such as, for example and without limitation, detection and/or recognition (e.g., scene or object detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, audio processing, and image processing, among other tasks. Moreover, machine learning models can be versatile and can achieve high quality results in a variety of tasks.

Different types of neural networks exist, such as deep generative neural network models (e.g., generative pre-trained transformers (GPTs) generative adversarial network (GANs)), recurrent neural network (RNN) models, multilayer perceptron (MLP) neural network models, convolutional neural network (CNN) models, among others.

FIG. 1 is a diagram 100 illustrating example relationships between machine learning tasks and various categories of neutral networks. In the example of FIG. 1, the largest oval represents a class of machine learning systems called generative models 102. As used herein, the term generative models refers to models that are capable of generating new data instances. In some cases, generative models 102 can be implemented with different machine learning architectures. For example, as noted above, GANs and GPTs are examples of deep generative neural network models. In addition to generative models 102, there are classes of machine learning systems, such as discriminative models. As used herein, discriminative models are models that discriminate between different types of data instances.

FIG. 1 illustrates another large oval representing a transformer 104 neural network architecture. As illustrated in FIG. 1, the transformer 104 can be utilized as a generative model 102 (e.g., for performing generative tasks) and/or as a non-generative model (e.g., a discriminative model). In general, a transformer 104 is a deep learning model. A transformer typically performs self-attention (e.g., using at least one self-attention layer), differentially weighting the significance of each part of input (which includes the recursive output) data. Transformers can be used in many contexts, including the fields of natural language processing (NLP) 110, image processing 120, audio processing 130, or the like. Like recurrent neural networks (RNNs), transformers are designed to process sequential input data, such as natural language, with application to tasks such as translation and text summarization. However, unlike RNNs, transformers process the entire input all at once. The attention mechanism provides context for any position in the input sequence. For example, if the input data is a natural language sentence, the transformer does not have to process one word at a time. This allows for more parallelization than RNNs and therefore reduces training times. Compared to RNN models, transformers are more amenable to parallelization, allowing training on larger datasets.

As illustrated in FIG. 1, NLP can include both natural language understanding (NLU) 112 and natural language generation (NLG) 114. NLU 112 refers to understanding the meaning of written and/or spoken language (e.g., text, speech, or a combination thereof). Examples of the NLU 112 include text inference or email classification. NLG 114 refers to the task of producing written and/or spoken language (e.g., text, speech, or a combination thereof) from structured data, unstructured data, or a combination thereof. Examples of NLG 114 include query-focused summarization, story generation, news summarization, conversational artificial intelligence (AI), an auto-complete system or combinations thereof. In some examples, NLP systems may include a combination of NLU 112 and NLG 114, such as question answering, interpreting and then summarizing content (e.g., a news article or a story), or a combination thereof. In some examples, NLG 114 can include transformer 104 based NLG as illustrated in FIG. 1.

In some cases, image processing 120 can also include understanding and generation aspects. For example, as illustrated in FIG. 1, image processing 120 includes image understanding (e.g., computer vision (CV) 122), and image generation 124. In one illustrative example, image processing 120 may be used to generate images of virtual environments, personal avatars, or the like in an XR environment. Image processing 120 can include processing of individual images as well as sequences of images (e.g., sequential images in a video). In one illustrative example, In another example, audio processing 130 can also include understanding and generation aspects. For example, as illustrated in FIG. 1, audio processing 130 includes audio understanding 132 and audio generation 134. For example, audio understanding 132 can be used to interpret audio data waveforms as words. Examples of audio generation 134 can include, synthesizing a voice (e.g., text to speech conversion), generating music, ambient sounds, and/or sound effects, or the like.

In some cases, multi-modal models (not shown) can incorporate and/or coordinate functionality between two or more different tasks. For example, a multi-model model can incorporate any combination of NLP 110, image processing 120, and/or audio processing 130. In on illustrative example, a multi-modal modal can receive audio data that contains a query, perform audio understanding 132 to generate a sequence of words (e.g., text) representing the query. In some examples, the sequence of words generated by audio understanding 132 can be an input to NLP 110, which can utilize NLU 112 to interpret the query and NLG 114 to generate an appropriate response. In some cases, a text response can be output from the NLG 114. In some implementations, audio generation 134 can convert the text response output from the NLG 114 into an audio response (e.g., a synthesized voice). In some implementations, image generation 124 can be used to generate an avatar (e.g., a 2D model, a 3D model, or the like) that can be displayed and coordinated with the output of the audio response generated by audio generation 134.

It should be understood that the examples of FIG. 1 are not meant to be limiting and are provided for the purposes of illustration only. Other types of machine learning models, neural network classes, neural network architectures, and/or any combination thereof that are not described herein can be used without departing from the scope of the present disclosure.

In some cases, digital content may be consumed by multiple consumers of digital content. As used herein, "users" refers to individual consumers of digital content. In some cases, consumers of digital content can include devices that obtain and/or output the digital content to one or more users. In some cases, the digital content may be consumed by multiple consumers of digital content in parallel. As used herein, parallel consumption of digital content includes consumption that occurs at least partially overlapping in time by two or more consumers of digital content. For example, digital content can include a live presentation that is broadcast to multiple users that can view the presentation together. In some cases, the content of the presentation may include a predefined scope of available information for the users viewing the presentation.

In some cases, individual consumers of digital content may be able to adjust some aspects of the presentation for their personal consumption. For example, the digital content may allow consumers of digital content to adjust playback speed, access portions of the digital content out of sequence with other consumers of the digital content, adjust language settings, apply subtitles, and/or any combination thereof. However, for some consumers of digital content, the predefined scope (including available adjustments) of the digital content may not align well with characteristics of every individual consumer of the digital content. For example, for digital content distributed to a large and diverse audience, the characteristics of individual consumers of the digital content are likely to contain larger variations. For instance, characteristics of consumers of the digital content can include, without limitation, personal capabilities, hardware capabilities (e.g., of a device outputting the digital content), background knowledge, education, professional experience, interest, engagement, environment (e.g., ambient light, ambient sound, maximum acceptable volume level), any other user characteristics that may affect the consumption of the digital content, and/or any combination thereof.

In some cases, creators of digital content can attempt to generate digital content that is well aligned with a large audience. However, attempting to manually generate digital content to appeal to an unknown audience can be time consuming and may still fail to adequately align with the characteristics of all consumers of digital content.

Systems and techniques are needed for automatically adapting digital content based on monitoring interaction between consumers of digital content and the digital content itself. For example, many consumers of digital content may be particularly interested in a subset of information within the digital content. By detecting the consumer of digital content's particular interest and/or other interactions with the digital content, one or more content adaptations can be generated to improve the digital content for the consumer of digital content.

Systems and techniques are described herein for content adaptation of digital content provided to multiple consumers of the digital content. For example, the systems and techniques can provide content adaptations to source content, also referred to herein as source digital content, digital content, original content, default content, default digital content, default source content, or original digital content. For example, the source content may be provided from a server, a streaming service, a content delivery network (CDN), any combination thereof, and/or other content source. When a consumer of digital content (e.g., a computing device) initially receives the source content, the source content may include a default configuration. As used herein, a default configuration can include a collection of content data (e.g., video, images, slides, audio, or the like), a sequence for outputting source content, size, position, and/or timing of outputting individual elements of the source content, content navigation features, language settings, accessibility features, supplemental content (e.g., optional background content, summaries, highlights, etc.), and/or any combination thereof. Examples of content navigation features include, without limitation, links, table of contents, a progress bar, navigation features (e.g., play, pause, fast-forward, rewind, skip forward/backward), or the like.

The system and techniques described herein can include content adaptation engines or modules that can generate content adaptations in response to content interaction information associated with consumption of source content. In some cases, content interaction information can be generated by monitoring modules. As used herein, content interaction information refers information about how one or more consumers of source content are interacting with the source content. Examples of content interaction information include, without limitation, user questions about the source content, user sentiment analysis, direct user inputs (e.g., opening a help menu, rating source content quality, or the like), user note taking, user expressions and/or emotions, eye tracking data, physiological indicators (e.g., heart rate, body temperature), anomaly detection, user responses to system generated interaction queries, and/or any combination thereof. In some cases, the content interaction information can include characteristics of consumers of digital content. For example, characteristics of consumers of digital content can include, without limitation, job title, self-identified areas of interest, education, In some cases, content interaction information for source content that is being actively consumed by a user can be compared with content interaction information for digital content that was previously consumed by the same user and/or by users with similar interests. For example, a user may be viewing an educational presentation and a monitoring engine can capture first content interaction information based on the user's interaction with the presentation. In some cases, the first content interaction information can be compared with user interaction information captured while the user is watching other content with which the user was previously highly engaged (e.g., a favorite television program, music, reading about a particularly interesting topic, listening to a music playlist, or the like). In some cases, the comparison of content interaction information can also be considered as additional content interaction information with respect to the source content.

In some cases, the content adaptation modules can obtain the content interaction information from the monitoring modules and generate content adaptations based on the content adaptation information. For example, the content adaptation modules may alter the default configuration of the source content to generate an adapted configuration for the source content. For example, generating an adapted configuration can include selecting and/or emphasizing materials that a user is highly interested in. In some cases, the adaptation module can deviate from the default sequence for outputting the source content and instead divert a user to a deep dive on the particular topic of interest. In another illustrative example, a content adaptation engine may generate a content adaptation to deviate from a default sequence when a user has a question and/or appears to have confusion about a particular portion of the source content. For example, the content adaptation can include displaying supplemental background content that is not included in the default sequence for outputting the digital content, but nevertheless was included in the original source content in anticipation of audience questions. The examples above provide examples of content adaptations that are based on the original source content. However, in some cases, the source content may not include information about a topic of interest and/or confusion to user.

In some cases, the systems and techniques can generate entirely new content can be adaptively generated (referred to herein as generated content) to adapt the source consumed by a particular user, group, category, role, or the like. In some implementations, a machine learning model (e.g., a generative model 102 of FIG. 1) can generate the generated content. For example, generative models can be trained to generate the generated content based on natural language inputs. For example, a machine learning model utilizing natural language processing (NLP) 110, image processing 120, audio processing 130, and/or a multi-modal model as describe with respect to FIG. 1 can be used to generate digital content (e.g., text, images, audio, or the like) based on a query. In some cases, a query can be provided directly by a user, for example, a user may ask a question, and in response to the question a generative module may generate text, images, and/or audio materials based on the question. In some cases, the systems and techniques can automatically generate a query based on analysis of the content interaction information obtained by the monitoring modules. For example, a user's gaze may linger on a particular image in the source content. In some cases, the content adaptation system can perform image understanding to recognize the content of an image and generate a query based on the image. In one illustrative example, the particular image can include a famous work of art (e.g., "Relativity" by M. C. Escher). In some cases, if the content interaction information indicated particular interest in the work of art, the content adaptation engine can generate a query such as, for example, "generate a one paragraph summary of the work 'Relativity' by M. C. Escher." In the illustrative example, the systems and techniques can generate a content adaptation, e.g., a text summary, that was not included in the source content.

In the examples described above, example content adaptations with respect to individual users. In some cases, the systems and techniques can include an aggregate adaptation engine that can be configured to obtain content adaptations and/or corresponding content interaction information from multiple devices. In some cases, the aggregate adaptation engine can obtain information about characteristics of consumers of digital content associated with the content adaptations and/or content interaction information. In some cases, based on similarities between the content adaptations, content interaction information, and/or characteristics of consumers of digital content obtained from two or more devices, the aggregate adaptation engine may determine that the two or more devices can be included in a group that can share one or more common content adaptations. In one illustrative example, based on the similarities between two or more devices, the aggregate adaptation engine can distribute a content adaptation generated by a content adaptation module of first device of the group and distribute the content adaptation to other devices of the group based on the similarities. In some cases, the aggregate adaptation engine may itself include a generative model that can generate content adaptations and distribute the content adaptations to different devices based on the similarities. In some cases, the aggregate adaptation engine can prepare statistical measures relating to the content adaptations, characteristics of consumers of digital content and/or user content interaction information that can be used to understand any gaps in the source content. In some cases, the aggregate adaptation engine can incorporate content adaptations into the source content to generate adapted source content. For example, the aggregate adaptation engine may determine that a particular content adaptation (e.g., a response to a frequently asked question) can be added to the source content. In some cases, by generating adapted source content for frequently applied content adaptations, the aggregate adaptation engine can reduce the computational burden of the content adaptation system repeatedly having to generate the same or similar content adaptations that may result if the source content is not adapted.

Figure 2:
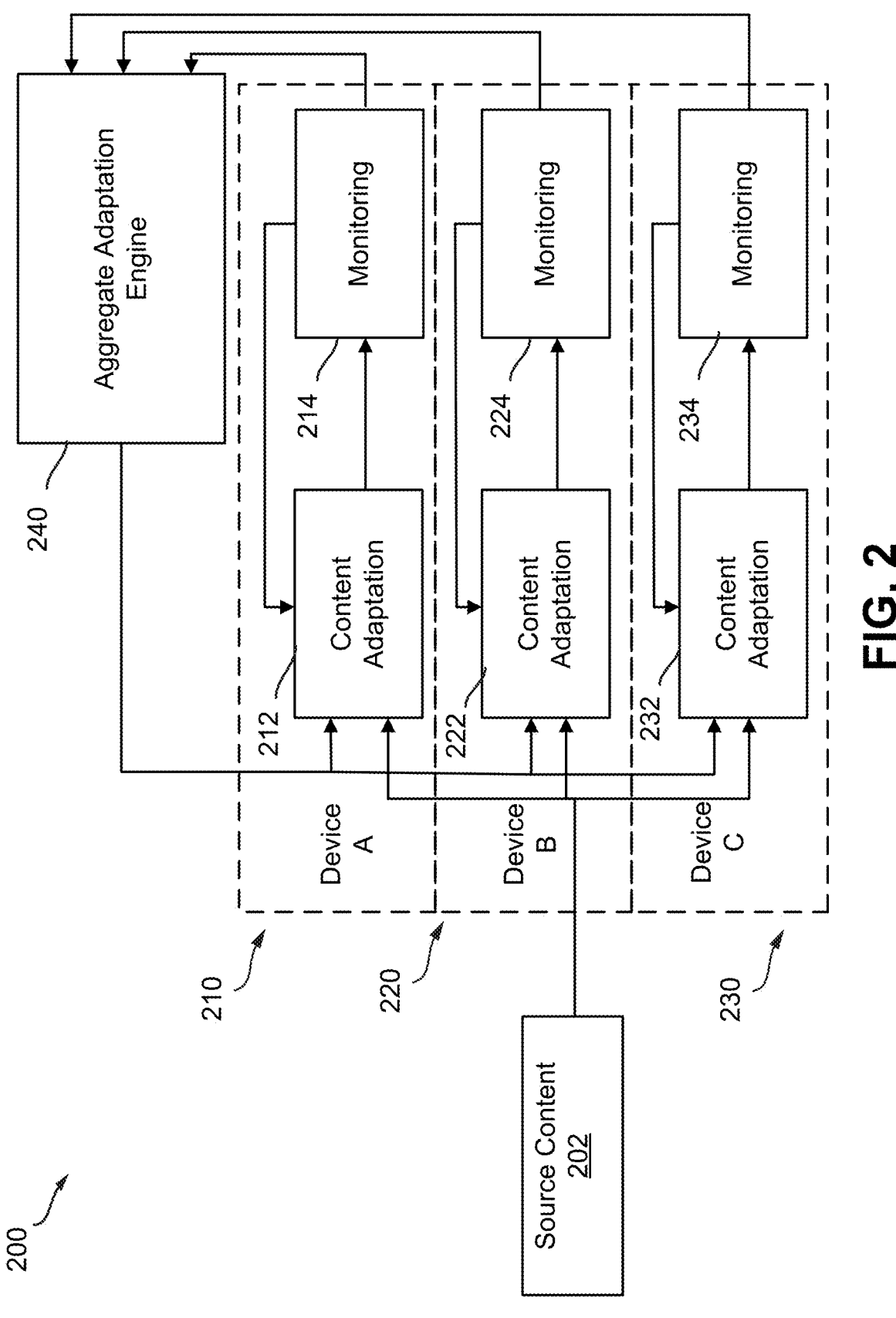
FIG. 2 is a block diagram illustrating an example of a content adaptation system, in accordance with some examples of the present disclosure.

Various aspects of the techniques described herein will be discussed below with respect to the figures. FIG. 2 illustrates an example content adaptation system 200 that can be used to provide digital content to multiple devices and/or users. As illustrated, the content adaptation system 200 can include content adaptation modules 212, 222, 232, and monitoring modules 214, 224, 234, and aggregate adaptation engine 240. In the illustrated example of FIG. 2, content adaptation module 212 and monitoring module 214 are included in a first device 210 ("Device A"). Content adaptation module 222 and monitoring module 224 are included in a second device 220 ("Device B"). Content adaptation module 232 and monitoring module 234 are included in a third device 230 ("Device C").

As illustrated in FIG. 2, in some cases, during output of the source content 202 by the devices 210, 220, 230 (e.g., by a display, speakers, and/or other output device), the monitoring modules 214, 224, 234 can be configured to collect inputs that may indicate the manner in which the users of the various devices 210, 220, 230 are interacting with the source content 202 content. As used herein, "content interaction information" refers to information captured by a monitoring modules 214, 224, 234 that is specific to a particular device 210, 220, 230 and/or corresponding user(s) of the devices 210, 220, 230. Content interaction information may include, without limitation, user questions about the source content 202, user sentiment analysis, user note taking, user expressions and/or emotions, eye tracking data, physiological indicators (e.g., heart rate, body temperature), and/or any combination thereof. For example, the monitoring module 214 may be able to detect that a user is not fully understanding the source content 202. In one illustrative example, the monitoring module 214 may detect (e.g., by a microphone of the device 210) a question spoken by a user over the first device 210 and/or written by the user in a note taking document. In some cases, the monitoring modules 214, 224, 234 can supply content interaction information to the respective content adaptation modules 212, 222, 232.

In some examples, content adaptation modules 212, 222, 232 can receive the source content 202 as well as content interaction information from respective monitoring modules 214, 224, 234 as input. In some examples, source content 202 may be content that is generated to inform, educate, and/or entertain a group of users. In some cases, the source content 202 can include, without limitation, videos, movies, presentation, documents, slides, audio recordings, and/or any combination thereof. In one illustrative example, the source content can include a video presentation accompanied by slides that can be viewed by users of the devices 210, 220, 230. In one illustrative example, the source content 202 can include a default configuration. For example, the default configuration for a deck of slides may include a default arrangement of text and/or figures on each slide. In some cases, the default configuration for the slides can include a default sequence corresponding to the order in which the presenter intends to conduct a corresponding video presentation. However, different users may interact with the source content 202 in ways that are not anticipated by the default configuration, which can result in a suboptimal experience for some users (or groups of users).

In some cases, the content adaptation modules 212, 222, 232 can be configured to alter the default configuration of the source content 202 based on the content interaction information. For example, the content adaptation module 212 may receive content interaction information from monitoring module 214 indicating a user has a question about a particular aspect of the source content 202.

Figure 3:
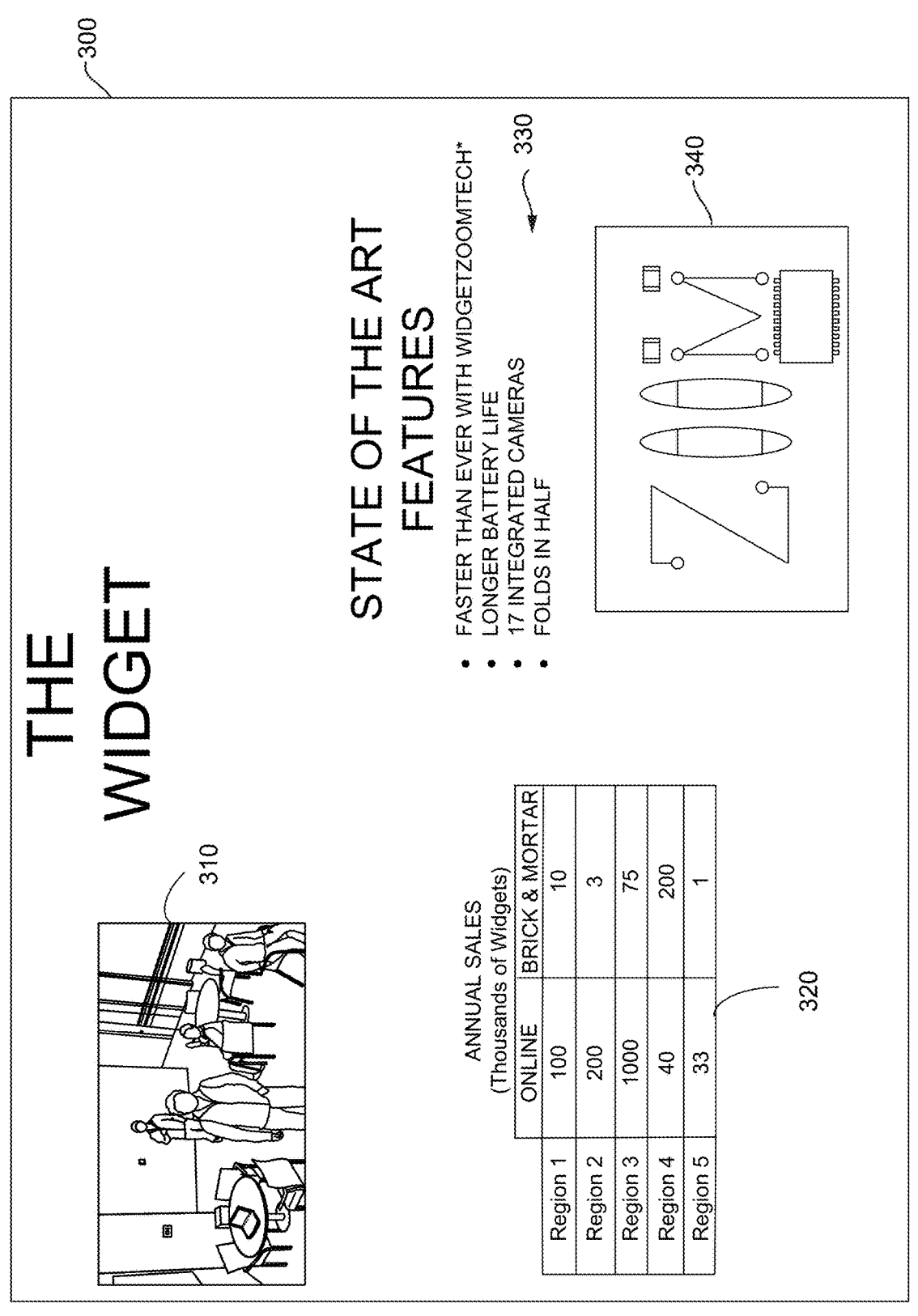
FIG. 3 illustrates example content that provides an illustrative example of content adaptation systems and techniques, in accordance with some examples of the present disclosure.

FIG. 3 is an example presentation content 300 (which can correspond to source content 202 of FIG. 2) that provides one illustrative example of various aspects of the content adaptation systems and techniques described herein. As illustrated, the presentation content 300 can include a presentation that is viewed by an audience that includes a first group that is more interested in technical details (e.g., engineers, scientists, or the like), a second group that is more interested in business details (e.g., marketing team, sales team, or the like), and a third group may be interested in both technical and business details (e.g., executives, project managers, or the like). In the example, the presentation content 300 may include a summary slide of a presentation presented at a particular timestamp of the presentation content 300 according to the. As illustrated, a video component 310 of the presentation content 300 may be overlaid over an empty corner of the summary slide. As illustrated, the presentation content 300 includes a list of technical features 330 of the product and a short list of business metrics 320 for the product. The presentation content 300 also includes a portion of a schematic 340 associated with one of the technical features in the list of technical features 330.

In some cases, the content adaptation system 200 can adaptively generate entirely new generated content to adapt the source content. In some implementations, a machine learning model (e.g., one or more generative models 102 of FIG. 1) can generate the generated content. For example, generative models can be trained to generate the generated content based on natural language inputs. For example, a machine learning model utilizing natural language processing (NLP) 110, image processing 120, audio processing 130, and/or a multi-modal model as describe with respect to FIG. 1 can be used to generate digital content (e.g., text, images, audio, or the like) based on a query. In some cases, a query can be provided directly by a user, for example, a user may ask a question, and in response to the question a generative module may generate text, images, and/or audio materials based on the question. In some cases, the systems and techniques can generate a automatically query based on analysis of the content interaction information obtained by the monitoring modules. For example, a user's gaze may linger on a particular image in the source content. In some cases, the content adaptation system can perform image understanding to recognize the content of an image and generate a query based on the image. In one illustrative example, the particular image can include a famous work of art (e.g., "Relativity" by M. C. Escher). In some cases, if the content interaction information indicates particular interest in the work of art, the content adaptation engine can generate a query such as, for example, "generate a one paragraph summary of the work 'Relativity' by M. C. Escher." In the illustrative example, the systems and techniques can generate a content adaptation, e.g., a text summary, that was not included in the source content.

As illustrated in FIG. 2, an aggregate adaptation engine 240 can obtain content adaptations, content interaction information, and/or characteristics of consumers of digital content from multiple devices (e.g., devices 210, 220, 230). In some cases, based on similarities between the content adaptations, content interaction information, and/or characteristics of consumers of digital content obtained from two or more devices, the aggregate adaptation engine may determine that the two or more devices can be included in a group that can share one or more common content adaptations. In one illustrative example, based on the similarities between two or more devices, the aggregate adaptation engine 240 can distribute a content adaptation generated by a content adaptation module of first device of the group and distribute the content adaptation to other devices of the group based on the similarities. In some cases, the aggregate adaptation engine 240 may itself include a generative model that can generate content adaptations and distribute the content adaptations to different devices based on the similarities between the content adaptations, content interaction information, and/or characteristics of consumers of digital content. In some cases, by distributing content adaptations to different devices, rather than generating content adaptations separately for individual devices, the total power consumption, computational load, and/or memory usage used by individual devices can be reduced. For example, reducing power consumption in battery powered devices can increase the amount of time that the device can be operated. As another example, reducing the computational load for an individual device can prevent the device temperature from reaching a thermal limit. In some cases, when a device reaches a thermal limit, the device performance may be reduced. In some cases, computational load and/or memory usage that is not allocated to content adaptations can be used to perform other device functionality.

In one illustrative example, the aggregate adaptation engine 240 may determine that a first content adaptation including a response to a question from a first user may be relevant to one or more other users. For example, the first content adaptation including the response to the question from the first user response may be generated content generated by a generative model. In some implementations, the aggregate adaptation engine 240 can generate a second content adaption that includes a simulated audience member voice asking the question originally asked by the first user. In some cases, the second content adaptation may be distributed to all consumers of the source content. In some cases, the second content adaptation may be distributed to a group of consumers of the source content based on similarities between content adaptations, content interaction information, and/or characteristics of consumers of digital content. In some cases, the aggregate adaptation engine 240 may provide the question to the presenter to answer the question directly. In another illustrative example, the aggregate adaptation engine 240 can distribute the same content adaptation response to the question provided to the first user to multiple other consumers of the source content 202 content. In some cases, the aggregate adaptation engine 240 can generate a content adaptation that includes a response to the original question by a generative neural network. In some cases, the newly generated content adaptation may be text only like the original response. In some cases, the newly generated content adaptation may include additional and/or different content. In one illustrative example, the newly generated content adaptation can include a synthesized voice and/or synthesized avatar to present the content adaptation to the other consumers of the source content.

In some cases, the aggregate adaptation engine 240 can prepare statistical measures relating to the content adaptations, characteristics of consumers of digital content and/or user content interaction information that can be used to understand any gaps in the source content. In some cases, the aggregate adaptation engine can incorporate content adaptations into the source content to generate adapted source content. In one illustrative example, digital content may be generated with a particular audience in mind (e.g., non-technical consumers) but may also be consumed by a different audience (e.g., technical consumers). In some aspects, the statistical measures generated by the aggregate adaptation engine 240 can be used to generate content adaptations (e.g, manually, automatically, and/or any combination thereof) to improve the digital content for different audiences.

In some implementations, the aggregate adaptation engine 240 may determine that a particular content adaptation (e.g., a response to a frequently asked question) can be added to the source content. In some cases, by generating adapted source content for frequently applied content adaptations, the aggregate adaptation engine 240 can reduce the computational burden of the content adaptation system repeatedly having to generate the same or similar content adaptations that may result if the source content is not adapted.

Figure 4A:
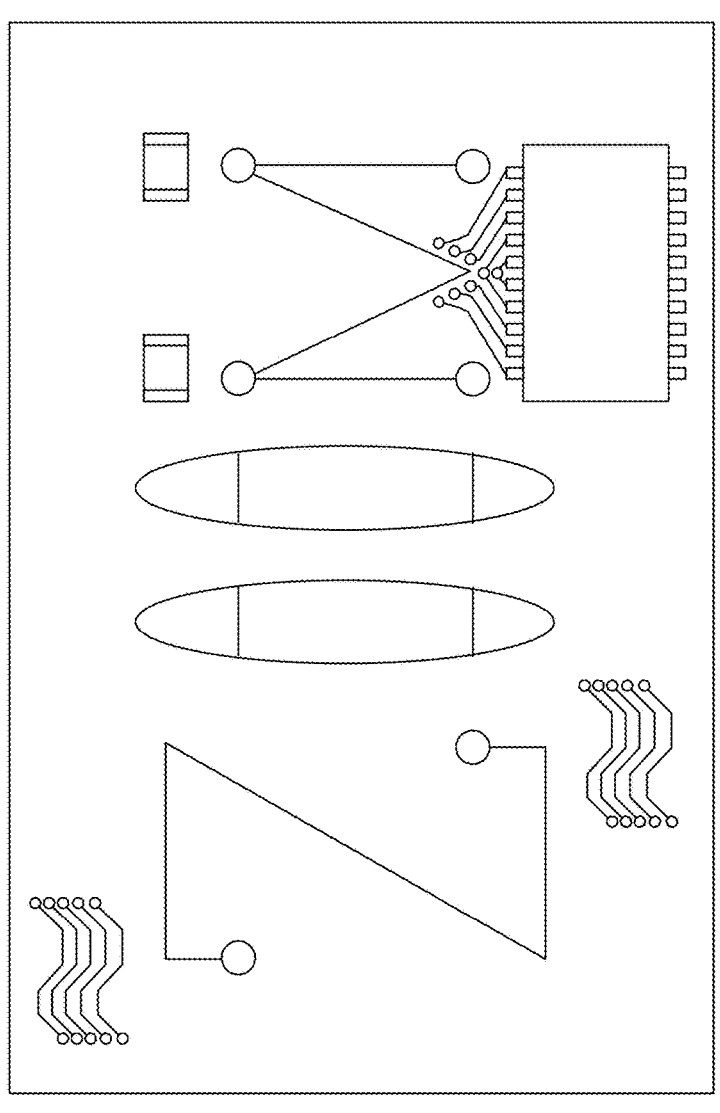
Figure 4C:
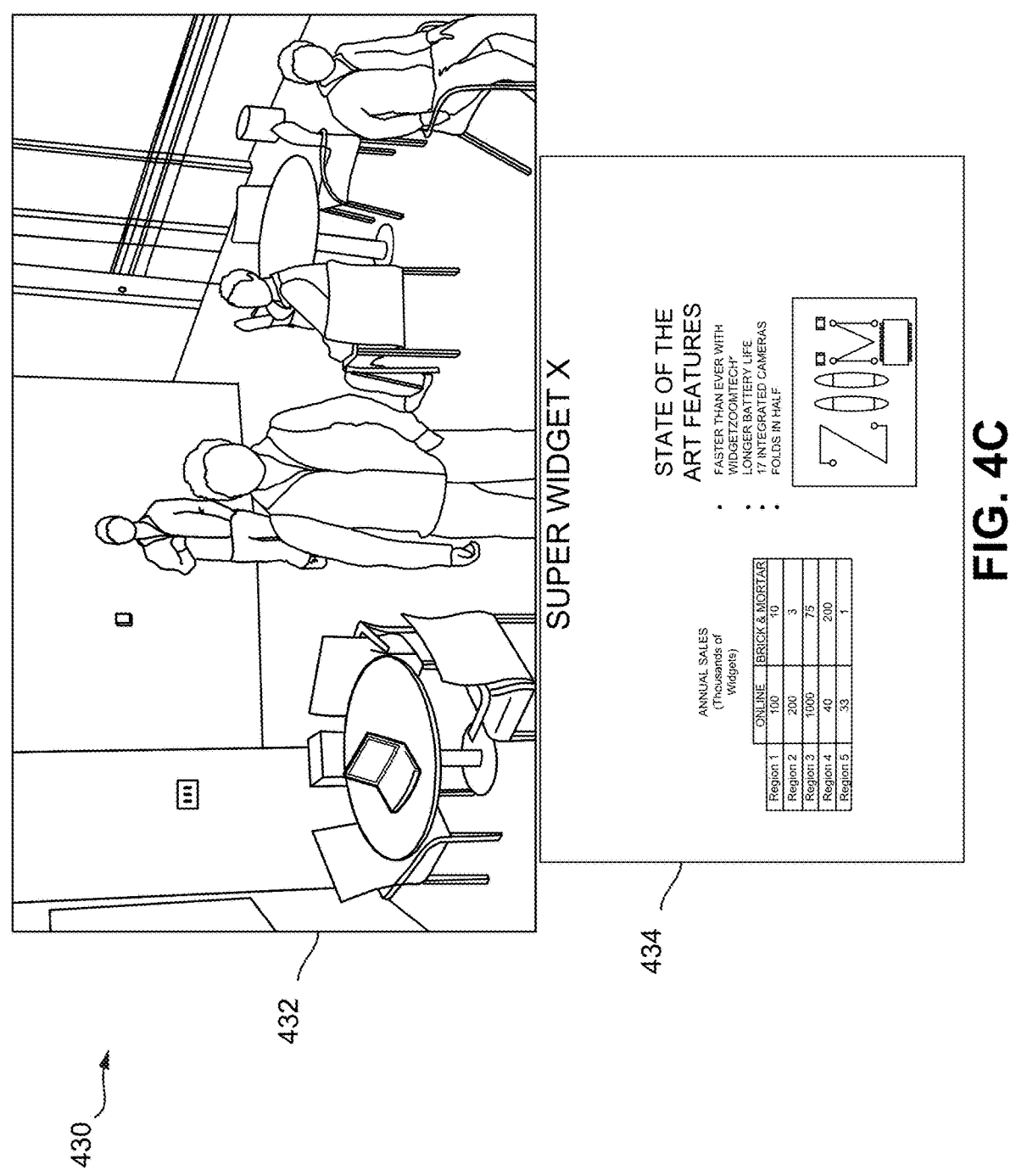

In some cases, content adaptation performed by the content adaptation system 200 can include branching a user (or group of users) into diverging content configurations based on the source content 202. For example, the first device 210 can be displaying the source content 202 to one or more members of the first group, the second device 220 can be displaying the source content 202 to one or more members of the second group, and the third device 230 can be displaying the source content 202 to the third group. The monitoring module 214 can detect content interaction information indicating a preference for the technical details provided in the summary slide. For example, the monitoring module 214 of first device 210 can detect first content information by performing eye tracking and determine that more time was spent by one or more members of the first group paying attention to technical details (e.g., list of technical features 330, schematic 340 of FIG. 3). In some cases, the monitoring module 224 of the second device 220 can detect second content information by capturing a question spoken by a member of the second group about business details (e.g., business metrics 320 of FIG. 3). In some aspects, the monitoring module 234 of third device 230 may detect third content information by performing a sentiment analysis on one or more members of the third group and determining that the third group members are interacting more with the presentation video (e.g., video component 310 of FIG. 3) and are less focused on the slides. In FIG. 4A through FIG. 4C illustrate example content adaptations of the presentation content 300 of FIG. 3. FIG. 4A illustrates an example content adaptation 410 for the first group interested in technical details as described above with respect to FIG. 3. In some cases, for the first group, the content adaptation module 212 of the content adaptation system 200 can receive the first content information from the monitoring module 214 and can deviate from the default configuration of the source content 202 (e.g., presentation content 300 of FIG. 3).

FIG. 4B illustrates an example content adaptation 420 for the second group interested in business details as described above with respect to FIG. 3. In some cases, for the second group, the content adaptation module 222 of the content adaptation system 200 can receive the second content information from the monitoring module 224 and can deviate from the default configuration of the source content 202 (e.g., presentation content 300 of FIG. 3).

FIG. 4C illustrates an example content adaptation 430 for the third group interest in both technical and business details as described above with respect to FIG. 3 respectively, described in the illustrative example above. In some cases, for the third group, the content adaptation module 232 of the content adaptation system 200 can receive the third content information from the monitoring module 234 and can deviate from the default configuration of the source content 202 (e.g., presentation content 300 of FIG. 3). For example, as illustrated in FIG. 4C, an enlarged presentation of a video component 432 (e.g., video component 310 of FIG. 3) can be presented to the third group while the slides 434 of the presentation content 300 can be reduced in size and re-arranged.

As noted above, the content adaptation system 200 and related techniques described herein can provide content adaptations for a source content to improve interaction between consumers of the source content and the source content itself. For examples, the systems and techniques can detect particular interest and/or confusion related to a particular aspect of the source content and generate a content adaptation to elaborate and/or focus on the interesting and/or confusing material. In some cases, content adaptations can be generated by adjusting a default configuration for outputting the source content. For example, a content adaptation can include altering a default sequence for outputting the source content. In some examples, the computing device can determine, based on a duration of the content adaptation, a sequence position in a default outputting sequence of the default configuration for outputting the digital content. In some implementations, outputting, by the device, the digital content based on the default configuration includes resuming the default configuration for outputting the digital content at the sequence position in the default outputting sequence. In some cases, the content adaptations can be configured to synchronize an ending time for concurrent outputting of the digital content by multiple devices. For example, a first device and a second device may output the digital content with different content adaptations (e.g., different sequences) and nevertheless finish outputting the digital content at the same time. In some implementations, the content adaptations can be configured to synchronize the ending time for outputting the digital content with the ending time of the default configuration. In some cases the content adaptations can be configured to synchronize the ending time for outputting the digital content between multiple devices at an ending time that is different from the ending time of the default configuration.

In some aspects, the computing device can determine a portion of the default configuration for outputting the digital content that was not output by the device during the content adaptation. In some cases, the computing device can generate a summary of the portion of the default configuration for outputting the digital content that was not output by the device during the content adaptation. In some implementations the computing device can output, by the device, the summary of the portion of the default configuration of outputting the digital content that was not output by the device during the content adaptation.

As another example, the content adaptation can include altering the display position and/or sizing of different content elements (e.g., zooming in on an interesting element of the source content). In some cases, content adaptation can include the generation of new digital content to supplement the original source content. For example, the systems and techniques described herein can include generating new content by a generative neural network. In some cases, the systems and techniques can determine the type of content adaptations to generate based on content interaction information. The content interaction information can include user queries, as well as other indications of user interaction as describe herein.

The systems and techniques described herein also include aggregation of content adaptation and distribution of content adaptations to multiple consumers of digital content. For example, an aggregate adaptation engine can obtain content adaptations, content interaction information, and/or characteristics of consumers of digital content. The aggregate adaptation engine can determine whether there are similarities between content adaptations, content interaction information, and/or characteristics of consumers of digital content and can create groups of consumers of digital content that can share one or more content adaptations. For example, the aggregate adaptation engine may provide content adaptations with additional technical details to a group of engineers viewing a presentation. In some cases, the aggregate adaptation engine may provide content adaptations with additional business metrics to a group of executives viewing the same presentation. In some cases, the aggregate adaptation engine can generate statistical measures of content adaptations, content interaction information, and/or characteristics of consumers of digital content that consume a particular source content. In some cases, the aggregate adaptation engine can generate a summary of the statistical measures that can be reviewed to understand whether changes to the source content may be beneficial. In some cases, the aggregate adaptation engine can generate content adaptations (e.g., responses to frequently asked questions) that can be incorporated in the source content to generate adapted source content. In some cases, a user requesting the source content can be provided the adapted source content in place of the original source content.

FIG. 5 is a flow diagram illustrating an example of a process 500 of adapting digital content. The process 500 and/or other process described herein can be performed by a computing device (or apparatus) or a component (e.g., a chipset, codec, etc.) of the computing device. The computing device may be an extended reality (XR) device (e.g., a virtual reality (VR) device or augmented reality (AR) device), a mobile device (e.g., a mobile phone), a network-connected wearable such as a watch, a vehicle or component or system of a vehicle, or other type of computing device. In one example, the process 500 and/or other process described herein can be performed by the content adaptation system 200 of FIG. 2. In another example, one or more of the processes can be performed by the computing system 800 shown in FIG. 8. For instance, a computing device with the computing system 800 shown in FIG. 8 can include the components of the content adaptation system 200 and can implement the operations of the process 500 of FIG. 5 and/or other process described herein. The operations of the process 500 may be implemented as software components that are executed and run on one or more processors (e.g., the processor 810 of FIG. 8, a processor such as a DSP, GPU, NPU, etc. configured to execute a machine learning model or algorithm, such as the deep learning network 600 of FIG. 6 or the CNN 700 of FIG. 7, or other processor(s)). Further, the transmission and reception of signals by the computing device in the process 500 may be enabled, for example, by one or more antennas, one or more transceivers (e.g., wireless transceiver(s)), and/or other communication components of the computing device (e.g., the communication interface 840 of FIG. 8).

At block 502, the computing device (or component thereof) can obtain a digital content (e.g., source content 202 of FIG. 2, presentation content 300 of FIG. 3) including a default configuration for outputting the digital content to a device (e.g., first device 210, devices 220 of FIG. 2).

At block 504, the computing device can output, by the device, the digital content based on the default configuration for outputting the digital content.

At block 506, the computing device can obtain, from a monitoring engine (e.g., monitoring module 214 of FIG. 2), content interaction information associated with outputting, by the device, the digital content based on the default configuration for outputting the digital content. In some aspects, the monitoring engine is configured to monitor one or more interactions between one or more users of the device and the digital content. In some examples, the content interaction information includes one or more of monitoring for asked questions, sentiment analysis, note taking by a user of a device, expression detection, emotion detection, eye tracking, heart-rate monitoring, body temperature monitoring, a response to a query, or a user input.

At block 508, the computing device can generate, based on the content interaction information, a content adaptation (e.g., content adaptation 410, 420, 430 of FIG. 4) for the digital content (e.g., by content adaptation modules 222, content adaptation modules 232 of FIG. 2). In some aspects, generating the content adaptation includes generating an adapted configuration, different from the default configuration, for outputting the digital content. In some cases, generating the content adaptation includes adjusting a default content output sequence for the digital content included in the default configuration to generate the adapted configuration. In some examples, generating the content adaptation includes generating, based on the digital content and the content interaction information, additional digital content for adapting the digital content. In some cases, the additional digital content is generated by a generative neural network (e.g., generative models 102 of FIG. 1). In some examples, generating the content adaptation includes processing one or more of the content interaction information or the digital content by a NLU (e.g., NLU 112 of FIG. 1) neural network to generate a content generation prompt. In some aspects, generating the additional digital content by the generative neural network. In some implementations, the generative neural network includes one or more of a NLP model (e.g., NLP 110 of FIG. 1), an image processing model (e.g., image processing 120 of FIG. 1), an audio processing model (e.g., audio processing 130 of FIG. 1), or a multimodal model.

At block 510, the computing device can output, by the device, the content adaptation for the digital content.

In some cases, the computing device can obtain, from the monitoring engine, subsequent to outputting the content adaptation, additional content interaction information associated with the one or more users of the device and the digital content. In some examples, the computing device can determine, based on the additional content interaction information, that outputting the digital content can be restored to the default configuration. In some aspects, the computing device can output, by the device, the digital content based on the default configuration. In some examples, the computing device can determine, based on a duration of the content adaptation, a sequence position in a default outputting sequence of the default configuration for outputting the digital content. In some implementations, outputting, by the device, the digital content based on the default configuration includes resuming the default configuration for outputting the digital content at the sequence position in the default outputting sequence. In some aspects, the computing device can determine a portion of the default configuration for outputting the digital content that was not output by the device during the content adaptation. In some cases, the computing device can generate a summary of the portion of the default configuration for outputting the digital content that was not output by the device during the content adaptation. In some implementations the computing device can output, by the device, the summary of the portion of the default configuration of outputting the digital content that was not output by the device during the content adaptation.

In some cases, the computing device can obtain additional content interaction information associated with outputting an additional digital content, different from the digital content, to a user of the device. In some examples, the content interaction information is associated with outputting the digital content to the user of the device. In some aspects, the computing device can compare the additional content interaction information to the content interaction information.

In some implementations, the computing device can output the content adaptation and the content interaction information to an aggregate adaptation engine (e.g, aggregate adaptation engine 240 of FIG. 2). In some examples, the computing device can output the content interaction information to an adaptation aggregation engine and obtain, based on the content interaction information, an additional content adaptation.

In some cases, the computing device can obtain, by a plurality of devices, the digital content having a default configuration for outputting the digital content by the plurality of devices. In some examples, the computing device can obtain, from the plurality of devices, a plurality of content adaptations and a plurality of content interaction information associated with the digital content. In some aspects, each content adaptation of the plurality of content adaptations is associated with one or more content interaction information of the plurality of content interaction information. In some implementations, the computing device can generate, based on the plurality of content adaptations obtained from the plurality of devices, an adapted digital content. In some cases, the adapted digital content includes at least one content adaptation. In some examples, the computing device can output the adapted digital content. In some aspects, outputting the adapted digital content includes replacing the default configuration for outputting the digital content with an adapted configuration for outputting the digital content.

In some cases, generating the adapted digital content includes categorizing the plurality of content adaptations into a plurality of content adaptation categories. In some examples, the computing device can obtain a plurality of statistical measures. In some aspects, each statistical measure is associated with a corresponding content adaptation category of the plurality of content adaptation categories. In some examples, the computing device can determine, for a particular statistical measure of the plurality of statistical measures, that the particular statistical measure exceeds a content adaptation category threshold; and generating, for one or more content adaptations of the plurality of content adaptations that corresponds to the particular statistical measure of the plurality of statistical measures determined to exceed the content adaptation category threshold, a content adaptation contribution to the adapted digital content. In some aspects, the computing device can determine, for an additional particular statistical measure of the plurality of statistical measures, that the additional particular statistical measure exceeds the content adaptation category threshold.

In some examples, generating the adapted digital content includes maintaining an association between one or more content adaptations with one or more associated content interaction information of the plurality of content interaction information.

In some implementations, prior to generating the adapted digital content, the computing device can determine that a total number of content adaptations exceeds a content adaptation significance threshold and based on determining that the total number of content adaptations exceeds the content adaptation significance threshold, generating the adapted digital content. In some cases, the adapted digital content is configured to cause a device to output the at least one content adaptation based on obtaining, by the device, an additional content interaction information associated with the at least one content adaptation.

As noted above, the processes described herein (e.g., process 500 and/or other process described herein) may be performed by a computing device or apparatus. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
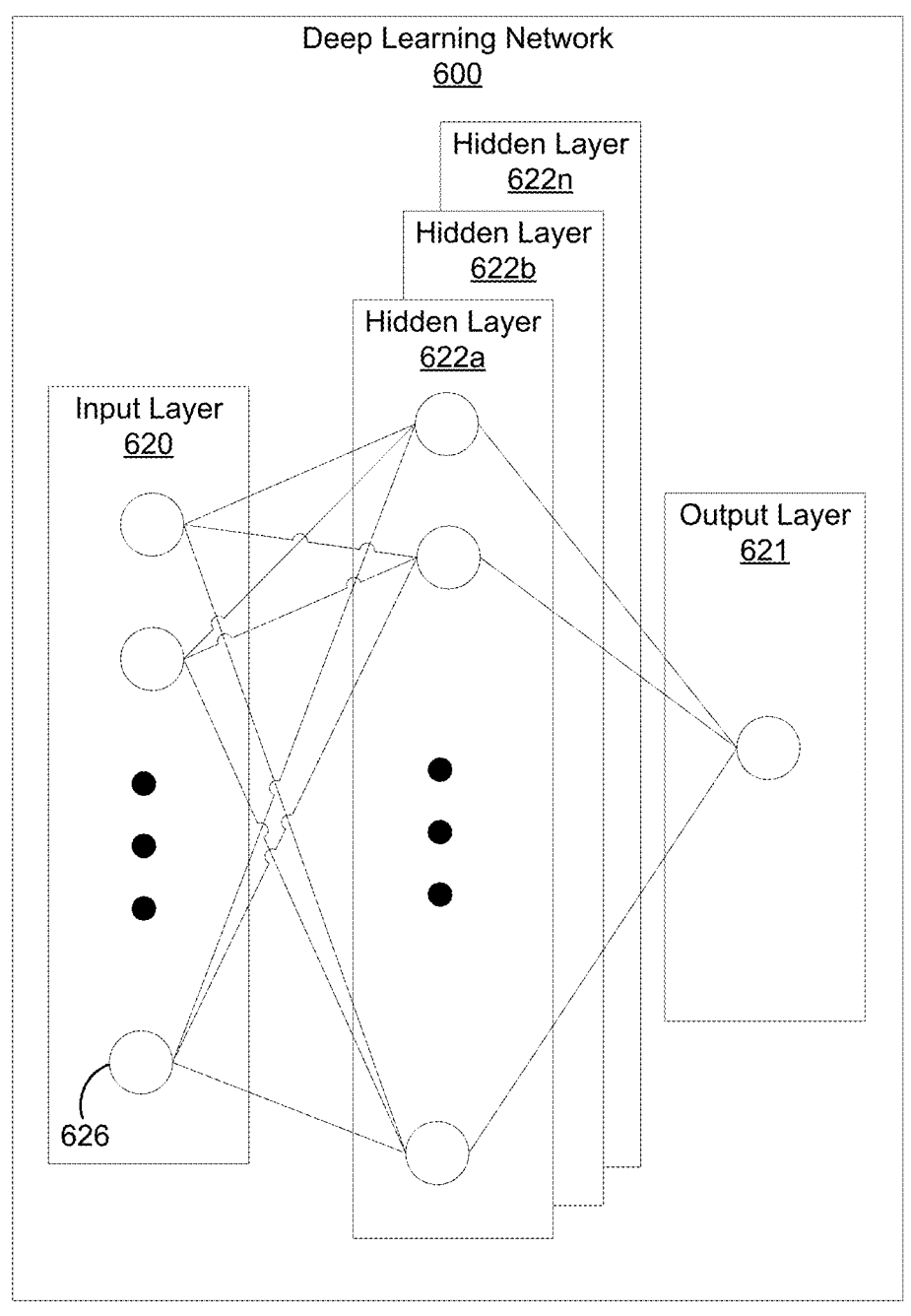
FIG. 6 is a block diagram illustrating an example of a deep learning network, in accordance with some examples.

As noted above, various aspects of the present disclosure can use machine learning models or systems. FIG. 6 is an illustrative example of a deep learning neural network 600 that can be used to implement the machine learning based feature extraction and/or activity recognition (or classification) described above. An input layer 620 includes input data. In one illustrative example, the input layer 620 can include data representing the pixels of an input video frame. The neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622a, 622b, through 622n. In one illustrative example, the output layer 621 can provide a classification for an object in an input video frame. The classification can include a class identifying the type of activity (e.g., looking up, looking down, closing eyes, yawning, etc.).

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622*a*. For example, as shown, each of the input nodes of the input layer 620 is connected to each of the nodes of the first hidden layer 622*a*. The nodes of the first hidden layer 622*a* can transform the information of each input node by applying activation functions to the input node information. The information derived from the transformation can then be passed to and can activate the nodes of the next hidden layer 622*b*, which can perform their own designated functions. Example functions include convolutional, up-sampling, data transformation, and/or any other suitable functions. The output of the hidden layer 622*b* can then activate nodes of the next hidden layer, and so on. The output of the last hidden layer 622*n* can activate one or more nodes of the output layer 621, at which an output is provided. In some cases, while nodes (e.g., node 626) in the neural network 600 are shown as having multiple output lines, a node has a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622*a*, 622*b*, through 622*n* in order to provide the output through the output layer 621. In an example in which the neural network 600 is used to identify activities being performed by a driver in frames, the neural network 600 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 600 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 600 is trained well enough so that the weights of the layers are accurately tuned.

For the example of identifying objects in frames, the forward pass can include passing a training frame through the neural network 600. The weights are initially randomized before the neural network 600 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 600 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 600 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, wi denotes the initial weight, and η denotes a learning rate. The learning rate can be set to any suitable value, with a high learning rate including larger weight updates and a lower value indicating smaller weight updates.

The neural network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, a deep belief nets (DBNs), a Recurrent Neural Networks (RNNs), among others.

Figure 7:
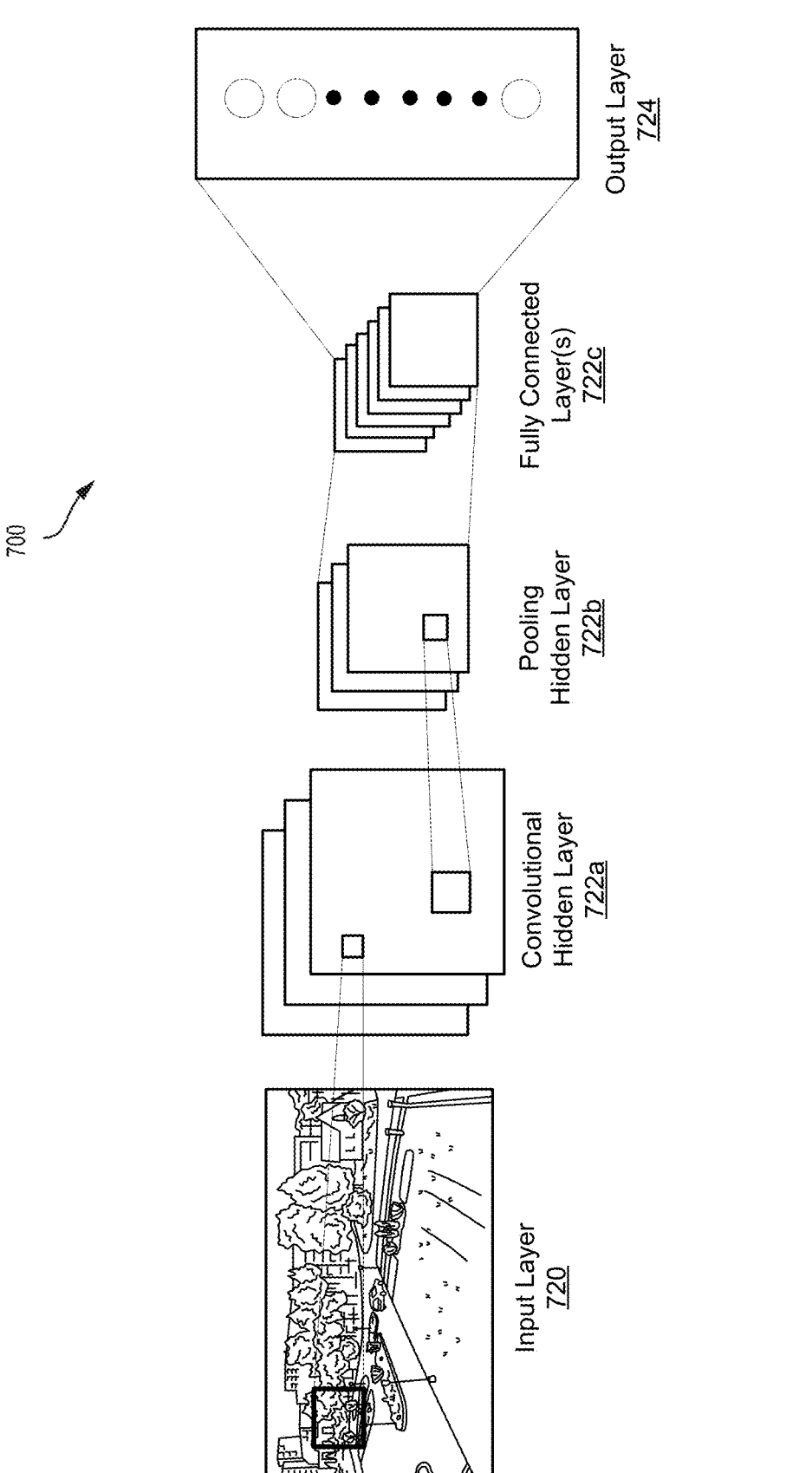
FIG. 7 is a block diagram illustrating an example of a convolutional neural network, in accordance with some examples.

FIG. 7 is an illustrative example of a convolutional neural network (CNN) 700. The input layer 720 of the CNN 700 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 722a, an optional non-linear activation layer, a pooling hidden layer 722b, and fully connected hidden layers 722c to get an output at the output layer 724. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 is the convolutional hidden layer 722a. The convolutional hidden layer 722a analyzes the image data of the input layer 720. Each node of the convolutional hidden layer 722a is connected to a region of nodes (pixels) of the input image called a receptive field. The convolutional hidden layer 722a can be considered as one or more filters (each filter corresponding to a different activation or feature map), with each convolutional iteration of a filter being a node or neuron of the convolutional hidden layer 722a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 722a. Each connection between a node and a receptive field for that node learns a weight and, in some cases, an overall bias such that each node learns to analyze its particular local receptive field in the input image. Each node of the hidden layer 722a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 722a is due to each node of the convolutional layer being applied to its corresponding receptive field. For example, a filter of the convolutional hidden layer 722a can begin in the top-left corner of the input image array and can convolve around the input image. As noted above, each convolutional iteration of the filter can be considered a node or neuron of the convolutional hidden layer 722a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 722a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 722a.

The mapping from the input layer to the convolutional hidden layer 722a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 722a can include several activation maps in order to identify multiple features in an image. The example shown in FIG. 7 includes three activation maps. Using three activation maps, the convolutional hidden layer 722a can detect three different kinds of features, with each feature being detectable across the entire image.

In some examples, a non-linear hidden layer can be applied after the convolutional hidden layer 722a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 700 without affecting the receptive fields of the convolutional hidden layer 722a.

The pooling hidden layer 722b can be applied after the convolutional hidden layer 722a (and after the non-linear hidden layer when used). The pooling hidden layer 722b is used to simplify the information in the output from the convolutional hidden layer 722a. For example, the pooling hidden layer 722b can take each activation map output from the convolutional hidden layer 722a and generates a condensed activation map (or feature map) using a pooling function. Max-pooling is one example of a function performed by a pooling hidden layer. Other forms of pooling functions be used by the pooling hidden layer 722a, such as average pooling, L2-norm pooling, or other suitable pooling functions. A pooling function (e.g., a max-pooling filter, an L2-norm filter, or other suitable pooling filter) is applied to each activation map included in the convolutional hidden layer 722a. In the example shown in FIG. 7, three pooling filters are used for the three activation maps in the convolutional hidden layer 722a.

In some examples, max-pooling can be used by applying a max-pooling filter (e.g., having a size of 2×2) with a stride (e.g., equal to a dimension of the filter, such as a stride of 2) to an activation map output from the convolutional hidden layer 722a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 722a having a dimension of 24×24 nodes, the output from the pooling hidden layer 722b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 722b to every one of the output nodes in the output layer 724. Using the example above, the input layer includes 28×28 nodes encoding the pixel intensities of the input image, the convolutional hidden layer 722a includes 3×24×24 hidden feature nodes based on application of a 5×5 local receptive field (for the filters) to three activation maps, and the pooling hidden layer 722b includes a layer of 3×12×12 hidden feature nodes based on application of max-pooling filter to 2×2 regions across each of the three feature maps. Extending this example, the output layer 724 can include ten output nodes. In such an example, every node of the 3×12×12 pooling hidden layer 722b is connected to every node of the output layer 724.

The fully connected layer 722c can obtain the output of the previous pooling hidden layer 722b (which should represent the activation maps of high-level features) and determines the features that most correlate to a particular class. For example, the fully connected layer 722c layer can determine the high-level features that most strongly correlate to a particular class, and can include weights (nodes) for the high-level features. A product can be computed between the weights of the fully connected layer 722c and the pooling hidden layer 722b to obtain probabilities for the different classes. For example, if the CNN 700 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 724 can include an M-dimensional vector (in the prior example, M=10). M indicates the number of classes that the CNN 700 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 8:
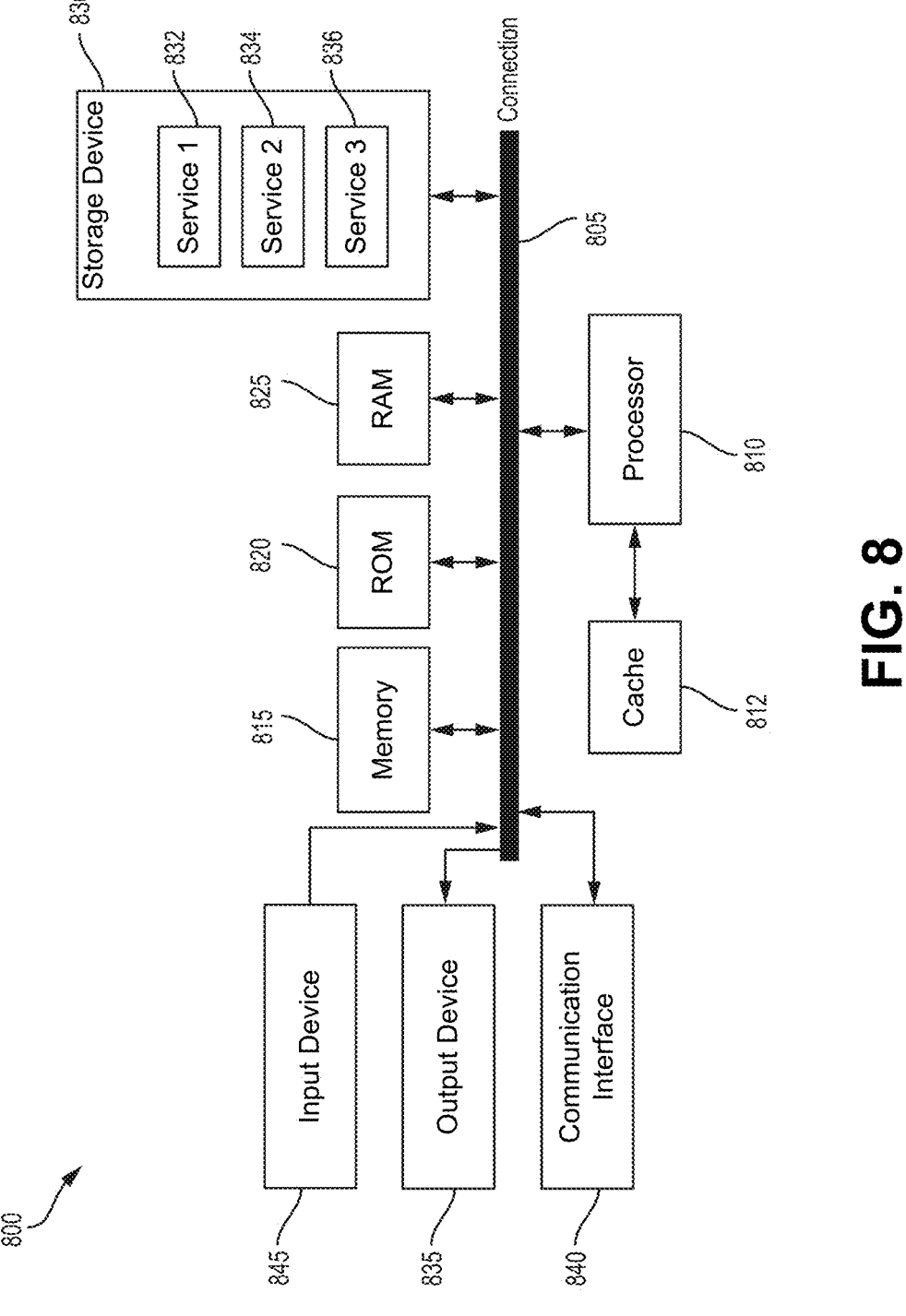
FIG. 8 is a diagram illustrating an example of a computing system for implementing certain aspects described herein.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose micropro- cessors, an application specific integrated circuits (ASICs), field programmable logic arrays (FPGAs), or other equiva- lent integrated or discrete logic circuitry. Such a processor may be configured to perform any of the techniques described in this disclosure. A general purpose processor may be a microprocessor; but in the alternative, the proces- sor may be any conventional processor, controller, micro- controller, or state machine. A processor may also be imple- mented as a combination of computing devices, e.g., a combination of a DSP and a microprocessor, a plurality of microprocessors, one or more microprocessors in conjunc- tion with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of adapting digital content, the method comprising: obtaining a digital content comprising a default configuration for outputting the digital content to a device; outputting, by the device, the digital content based on the default configuration for outputting the digital con- tent; obtaining, from a monitoring engine, content interac- tion information associated with outputting, by the device, the digital content based on the default configuration for outputting the digital content, wherein the monitoring engine is configured to monitor one or more interactions between one or more users of the device and the digital content; generating, based on the content interaction infor- mation, a content adaptation for the digital content; and outputting, by the device, the content adaptation for the digital content.

Aspect 2. The method of Aspect 1, wherein generating the content adaptation comprises generating an adapted con- figuration, different from the default configuration, for out- putting the digital content.

Aspect 3. The method of any of Aspects 1 to 2, wherein generating the content adaptation comprises adjusting a default content output sequence for the digital content included in the default configuration to generate the adapted configuration.

Aspect 4. The method of any of Aspects 1 to 3, further comprising: obtaining, from the monitoring engine, subse- quent to outputting the content adaptation, additional con- tent interaction information associated with the one or more users of the device and the digital content; determining, based on the additional content interaction information, that outputting the digital content can be restored to the default configuration; and outputting, by the device, the digital content based on the default configuration.

Aspect 5. The method of any of Aspects 1 to 4, further comprising determining, based on a duration of the content adaptation, a sequence position in a default outputting sequence of the default configuration for outputting the digital content, wherein outputting, by the device, the digital content based on the default configuration comprises resuming the default configuration for outputting the digital con- tent at the sequence position in the default outputting sequence.

Aspect 6. The method of any of Aspects 1 to 5, further comprising, determining a portion of the default configura- tion for outputting the digital content that was not output by the device during the content adaptation; generating a sum- mary of the portion of the default configuration for output- ting the digital content that was not output by the device during the content adaptation; and outputting, by the device, the summary of the portion of the default configuration of outputting the digital content that was not output by the device during the content adaptation.

Aspect 7. The method of any of Aspects 1 to 6, wherein generating the content adaptation comprises generating, based on the digital content and the content interaction information, additional digital content for adapting the digi- tal content.

Aspect 8. The method of any of Aspects 1 to 7, wherein the additional digital content is generated by a generative neural network.

Aspect 9. The method of any of Aspects 1 to 8, wherein generating the content adaptation comprises: processing one or more of the content interaction information or the digital content by a natural language understanding (NLU) neural network to generate a content generation prompt; and gen- erating the additional digital content by the generative neural network.

Aspect 10. The method of any of Aspects 1 to 9, wherein the generative neural network comprises one or more of a natural language processing (NLP) model, an image pro- cessing model, an audio processing model, or a multi-modal model.

Aspect 11. The method of any of Aspects 1 to 10, wherein the content interaction information comprises one or more of monitoring for asked questions, sentiment analysis, note taking by a user of a device, expression detection, emotion detection, eye tracking, heart-rate monitoring, body tem- perature monitoring, a response to a query, or a user input.

Aspect 12. The method of any of Aspects 1 to 11, further comprising: obtaining additional content interaction infor- mation associated with outputting an additional digital con- tent, different from the digital content, to a user of the device, wherein the content interaction information is asso- ciated with outputting the digital content to the user of the device; and comparing the additional content interaction information to the content interaction information.

Aspect 13. The method of any of Aspects 1 to 12, further comprising: determining that a first user engagement level associated with the content interaction information is less than a second user engagement level associated with the additional content interaction information; and based on determining that the first user engagement level is less than the second user engagement level, generating the content adaptation.

Aspect 14. The method of any of Aspects 1 to 13, further comprising outputting the content adaptation and the content interaction information to an aggregate adaptation engine.

Aspect 15. The method of any of Aspects 1 to 14, further comprising: outputting the content interaction information to an adaptation aggregation engine; and obtaining, based on the content interaction information, an additional content adaptation.

Aspect 16. The method of any of Aspects 1 to 15, further comprising: obtaining, by a plurality of devices, the digital content having a default configuration for outputting the digital content by the plurality of devices; obtaining, from the plurality of devices, a plurality of content adaptations and a plurality of content interaction information associated with the digital content, wherein each content adaptation of the plurality of content adaptations is associated with one or more content interaction information of the plurality of content interaction information; generating, based on the plurality of content adaptations obtained from the plurality of devices, an adapted digital content, wherein the adapted digital content comprises at least one content adaptation; and outputting the adapted digital content.

Aspect 17. The method of any of Aspects 1 to 16, wherein outputting the adapted digital content comprises replacing the default configuration for outputting the digital content with an adapted configuration for outputting the digital content.

Aspect 18. The method of any of Aspects 1 to 17, wherein generating the adapted digital content comprises: categorizing the plurality of content adaptations into a plurality of content adaptation categories; obtaining a plurality of statistical measures, wherein each statistical measure is associated with a corresponding content adaptation category of the plurality of content adaptation categories; determining, for a particular statistical measure of the plurality of statistical measures, that, that the particular statistical measure exceeds a content adaptation category threshold; and generating, for one or more content adaptations of the plurality of content adaptations that corresponds to the particular statistical measure of the plurality of statistical measures determined to exceed the content adaptation category threshold, a content adaptation contribution to the adapted digital content.

Aspect 19. The method of any of Aspects 1 to 18, determining, for an additional particular statistical measure of the plurality of statistical measures, that the additional particular statistical measure exceeds the content adaptation category threshold.

Aspect 20. The method of any of Aspects 1 to 19, further comprising: prior to generating the adapted digital content, determining that a total number of content adaptations exceeds a content adaptation significance threshold; and based on determining that the total number of content adaptations exceeds the content adaptation significance threshold, generating the adapted digital content.

Aspect 21. The method of any of Aspects 1 to 20, wherein generating the adapted digital content comprises maintaining an association between one or more content adaptations with one or more associated content interaction information of the plurality of content interaction information.

Aspect 22. The method of any of Aspects 1 to 21, wherein the adapted digital content is configured to cause a device to output the at least one content adaptation based on obtaining, by the device, an additional content interaction information associated with the at least one content adaptation.

Aspect 23. An apparatus for adapting digital content. The apparatus includes at least one memory and at least one processor coupled to the at least one memory. The at least one processor is configured to: obtain a digital content comprising a default configuration for outputting the digital content to a device; output, by the device, the digital content based on the default configuration for outputting the digital content; obtain, from a monitoring engine, content interaction information associated with outputting, by the device, the digital content based on the default configuration for outputting the digital content, wherein the monitoring engine is configured to monitor one or more interactions between one or more users of the device and the digital content; generate, based on the content interaction information, a content adaptation for the digital content; and output, by the device, the content adaptation for the digital content.

Aspect 24. The apparatus of Aspect 23, wherein generating the content adaptation comprises generating an adapted configuration, different from the default configuration, for outputting the digital content.

Aspect 25. The apparatus of any of Aspects 23 to 24, wherein generating the content adaptation comprises adjusting a default content output sequence for the digital content included in the default configuration to generate the adapted configuration.

Aspect 26. The apparatus of any of Aspects 23 to 25, wherein the at least one processor is configured to: obtain, from the monitoring engine, subsequent to outputting the content adaptation, additional content interaction information associated with the one or more users of the device and the digital content; determine, based on the additional content interaction information, that outputting the digital content can be restored to the default configuration; and output, by the device, the digital content based on the default configuration.

Aspect 27. The apparatus of any of Aspects 23 to 26, wherein the at least one processor is configured to determine, based on a duration of the content adaptation, a sequence position in a default outputting sequence of the default configuration for outputting the digital content, wherein outputting, by the device, the digital content based on the default configuration comprises resuming the default configuration for outputting the digital content at the sequence position in the default outputting sequence.

Aspect 28. The apparatus of any of Aspects 23 to 27, wherein the at least one processor is configured to: determine a portion of the default configuration for outputting the digital content that was not output by the device during the content adaptation; generate a summary of the portion of the default configuration for outputting the digital content that was not output by the device during the content adaptation; and output, by the device, the summary of the portion of the default configuration of outputting the digital content that was not output by the device during the content adaptation.

Aspect 29. The apparatus of any of Aspects 23 to 28, wherein generating the content adaptation comprises generating, based on the digital content and the content interaction information, additional digital content for adapting the digital content.

Aspect 30. The apparatus of any of Aspects 23 to 29, wherein the additional digital content is generated by a generative neural network.

Aspect 31. The apparatus of any of Aspects 23 to 30, wherein, to generate the content adaptation, the at least one processor is configured to: process one or more of the content interaction information or the digital content by a natural language understanding (NLU) neural network to generate a content generation prompt; and generate the additional digital content by the generative neural network.

Aspect 32. The apparatus of any of Aspects 23 to 31, wherein the generative neural network comprises one or more of a natural language processing (NLP) model, an image processing model, an audio processing model, or a multi-modal model.

Aspect 33. The apparatus of any of Aspects 23 to 32, wherein the content interaction information comprises one or more of monitoring for asked questions, sentiment analysis, note taking by a user of a device, expression detection, emotion detection, eye tracking, heart-rate monitoring, body temperature monitoring, a response to a query, or a user input.

Aspect 34. The apparatus of any of Aspects 23 to 33, wherein the at least one processor is configured to obtain additional content interaction information associated with outputting an additional digital content, different from the digital content, to a user of the device, wherein the content interaction information is associated with outputting the digital content to the user of the device; and compare the additional content interaction information to the content interaction information.

Aspect 35. The apparatus of any of Aspects 23 to 34, wherein the at least one processor is configured to determine that a first user engagement level associated with the content interaction information is less than a second user engagement level associated with the additional content interaction information; and based on determining that the first user engagement level is less than the second user engagement level, generate the content adaptation.

Aspect 36. The apparatus of any of Aspects 23 to 35, wherein the at least one processor is configured to: output the content adaptation and the content interaction information to an aggregate adaptation engine.

Aspect 37. The apparatus of any of Aspects 23 to 36, wherein the at least one processor is configured to: output the content interaction information to an adaptation aggregation engine; and obtain, based on the content interaction information, an additional content adaptation.

Aspect 38. The apparatus of any of Aspects 23 to 37, wherein, to generate the adapted content, the at least one processor is configured to: obtain, by a plurality of devices, the digital content having a default configuration for outputting the digital content by the plurality of devices; obtain, from the plurality of devices, a plurality of content adaptations and a plurality of content interaction information associated with the digital content, wherein each content adaptation of the plurality of content adaptations is associated with one or more content interaction information of the plurality of content interaction information; generate, based on the plurality of content adaptations obtained from the plurality of devices, an adapted digital content, wherein the adapted digital content comprises at least one content adaptation; and output the adapted digital content.

Aspect 39. The apparatus of any of Aspects 23 to 38, wherein, to output the adapted digital content, the at least one processor is configured to replace the default configuration for outputting the digital content with an adapted configuration for outputting the digital content.

Aspect 40. The apparatus of any of Aspects 23 to 39, wherein, to generate the adapted digital content, the at least one processor is configured to: categorize the plurality of content adaptations into a plurality of content adaptation categories; obtain a plurality of statistical measures, wherein each statistical measure is associated with a corresponding content adaptation category of the plurality of content adaptation categories; determine, for a particular statistical measure of the plurality of statistical measures, that the particular statistical measure exceeds a content adaptation category threshold; and generate, for one or more content adaptations of the plurality of content adaptations that corresponds to the particular statistical measure of the plurality of statistical measures determined to exceed the content adaptation category threshold, a content adaptation contribution to the adapted digital content.

Aspect 41. The apparatus of any of Aspects 23 to 40, wherein the at least one processor is configured to: for an additional particular statistical measure of the plurality of statistical measures, determine that the additional particular statistical measure exceeds the content adaptation category threshold.

Aspect 42. The apparatus of any of Aspects 23 to 41, wherein the at least one processor is configured to: prior to generating the adapted digital content, determine that a total number of content adaptations exceeds a content adaptation significance threshold; and based on determining that the total number of content adaptations exceeds the content adaptation significance threshold, generate the adapted digital content.

Aspect 43. The apparatus of any of Aspects 23 to 42, wherein generating the adapted digital content comprises maintaining an association between one or more content adaptations with one or more associated content interaction information of the plurality of content interaction information.

Aspect 44. The apparatus of any of Aspects 23 to 43, wherein the at least one processor is configured to cause a device to output the at least one content adaptation based on obtaining, by the device, an additional content interaction information associated with the at least one content adaptation.

Aspect 45. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: obtain a digital content comprising a default configuration for outputting the digital content to a device; output, by the device, the digital content based on the default configuration for outputting the digital content; obtain, from a monitoring engine, content interaction information associated with outputting, by the device, the digital content based on the default configuration for outputting the digital content, wherein the monitoring engine is configured to monitor one or more interactions between one or more users of the device and the digital content; generate, based on the content interaction information, a content adaptation for the digital content; and output, by the device, the content adaptation for the digital content.

Aspect 46. The computer readable medium of Aspect 45, wherein generating the content adaptation comprises generating an adapted configuration, different from the default configuration, for outputting the digital content.

Aspect 47. The computer readable medium of any of Aspects 45 to 46, wherein generating the content adaptation comprises adjusting a default content output sequence for the digital content included in the default configuration to generate the adapted configuration.

Aspect 48. The computer readable medium of any of Aspects 45 to 47, wherein the processor is configured to execute the computer readable medium and cause the processor to: obtain, from the monitoring engine, subsequent to outputting the content adaptation, additional content interaction information associated with the one or more users of the device and the digital content; determine, based on the additional content interaction information, that outputting the digital content can be restored to the default configuration; and output, by the device, the digital content based on the default configuration.

Aspect 49. The computer readable medium of any of Aspects 45 to 48, wherein the processor is configured to execute the computer readable medium and cause the processor to: determine, based on a duration of the content adaptation, a sequence position in a default outputting sequence of the default configuration for outputting the digital content, wherein outputting, by the device, the digital content based on the default configuration comprises resuming the default configuration for outputting the digital content at the sequence position in the default outputting sequence.

Aspect 50. The computer readable medium of any of Aspects 45 to 49, wherein the processor is configured to execute the computer readable medium and cause the processor to: determine a portion of the default configuration for outputting the digital content that was not output by the device during the content adaptation; generate a summary of the portion of the default configuration for outputting the digital content that was not output by the device during the content adaptation; and output, by the device, the summary of the portion of the default configuration of outputting the digital content that was not output by the device during the content adaptation.

Aspect 51. The computer readable medium of any of Aspects 45 to 50, wherein generating the content adaptation comprises generating, based on the digital content and the content interaction information, additional digital content for adapting the digital content.

Aspect 52. The computer readable medium of any of Aspects 45 to 51, wherein the additional digital content is generated by a generative neural network.

Aspect 53. The computer readable medium of any of Aspects 45 to 52, wherein the processor is configured to execute the computer readable medium and cause the processor to: process one or more of the content interaction information or the digital content by a natural language understanding (NLU) neural network to generate a content generation prompt; and generate the additional digital content by the generative neural network.

Aspect 54. The computer readable medium of any of Aspects 45 to 53, wherein the generative neural network comprises one or more of a natural language processing (NLP) model, an image processing model, an audio processing model, or a multi-modal model.

Aspect 55. The computer readable medium of any of Aspects 45 to 54, wherein the content interaction information comprises one or more of monitoring for asked questions, sentiment analysis, note taking by a user of a device, expression detection, emotion detection, eye tracking, heart-rate monitoring, body temperature monitoring, a response to a query, or a user input.

Aspect 56. The computer readable medium of any of Aspects 45 to 55, wherein the processor is configured to execute the computer readable medium and cause the processor to: obtain additional content interaction information associated with outputting an additional digital content, different from the digital content, to a user of the device, wherein the content interaction information is associated with outputting the digital content to the user of the device; and compare the additional content interaction information to the content interaction information.

Aspect 57. The computer readable medium of any of Aspects 45 to 56, wherein the processor is configured to execute the computer readable medium and cause the processor to: determine that a first user engagement level associated with the content interaction information is less than a second user engagement level associated with the additional content interaction information; and based on determining that the first user engagement level is less than the second user engagement level, generate the content adaptation.

Aspect 58. The computer readable medium of any of Aspects 45 to 57, wherein the processor is configured to execute the computer readable medium and cause the processor to: output the content adaptation and the content interaction information to an aggregate adaptation engine.

Aspect 59. The computer readable medium of any of Aspects 45 to 58, wherein the processor is configured to execute the computer readable medium and cause the processor to: output the content interaction information to an adaptation aggregation engine; and obtain, based on the content interaction information, an additional content adaptation.

Aspect 60. The computer readable medium of any of Aspects 45 to 59, wherein the processor is configured to execute the computer readable medium and cause the processor to: obtain, by a plurality of devices, the digital content having a default configuration for outputting the digital content by the plurality of devices; obtain, from the plurality of devices, a plurality of content adaptations and a plurality of content interaction information associated with the digital content, wherein each content adaptation of the plurality of content adaptations is associated with one or more content interaction information of the plurality of content interaction information; generate, based on the plurality of content adaptations obtained from the plurality of devices, an adapted digital content, wherein the adapted digital content comprises at least one content adaptation; and output the adapted digital content.

Aspect 61. The computer readable medium of any of Aspects 45 to 60, wherein, to output the adapted digital content, the processor is configured to execute the computer readable medium and cause the processor to: replace the default configuration for outputting the digital content with an adapted configuration for outputting the digital content.

Aspect 62. The computer readable medium of any of Aspects 45 to 61, wherein the processor is configured to execute the computer readable medium and cause the processor to: categorize the plurality of content adaptations into a plurality of content adaptation categories; obtain a plurality of statistical measures, wherein each statistical measure is associated with a corresponding content adaptation category of the plurality of content adaptation categories; determine, for a particular statistical measure of the plurality of statistical measures, that the particular statistical measure exceeds a content adaptation category threshold; and generate, for one or more content adaptations of the plurality of content adaptations that corresponds to the particular statistical measure of the plurality of statistical measures determined to exceed the content adaptation category threshold, a content adaptation contribution to the adapted digital content.

Aspect 63. The computer readable medium of any of Aspects 45 to 62, wherein the processor is configured to execute the computer readable medium and cause the processor to: for an additional particular statistical measure of the plurality of statistical measures, determine that the additional particular statistical measure exceeds the content adaptation category threshold.

Aspect 64. The computer readable medium of any of Aspects 45 to 63, wherein the processor is configured to execute the computer readable medium and cause the processor to: prior to generating the adapted digital content, determine that a total number of content adaptations exceeds a content adaptation significance threshold; and based on determining that the total number of content adaptations exceeds the content adaptation significance threshold, generate the adapted digital content.

Aspect 65. The computer readable medium of any of Aspects 45 to 64, wherein generating the adapted digital content comprises maintaining an association between one or more content adaptations with one or more associated content interaction information of the plurality of content interaction information.

Aspect 66. The computer readable medium of any of Aspects 45 to 65, wherein, the processor is configured to execute the computer readable medium and cause the processor to: cause a device to output the at least one content adaptation based on obtaining, by the device, an additional content interaction information associated with the at least one content adaptation.

Aspect 67. A method of coordinating content adaptations, the method comprising: obtaining, by an aggregate adaptation engine, from a device, first content interaction information; comparing the first content interaction information and a second content interaction information, wherein the second content interaction information is obtained from one or more additional devices, different from the device; and outputting, based on comparing the first content interaction information and the second content interaction information, a content adaptation to the device.

Aspect 68. The method of Aspect 67, wherein the content adaptation is obtained by the aggregate adaptation engine from a particular device of the one or more additional devices, and wherein based on comparing the first content interaction information and the second content interaction information, the aggregate adaptation engine determines an association between a first user of the device and a second user of the particular device of the one or more additional devices.

Aspect 69. The method of any of Aspects 67 to 68, wherein the second content interaction information comprises an aggregation of content interaction information obtained by the aggregate adaptation engine from the one or more additional devices.

Aspect 70. An apparatus for coordinating content adaptations. The apparatus includes at least one memory and at least one processor coupled to the at least one memory. The at least one processor is configured to: obtain, by an aggregate adaptation engine, from a device, first content interaction information; compare the first content interaction information and a second content interaction information, wherein the second content interaction information is obtained from one or more additional devices, different from the device; and output, based on comparing the first content interaction information and the second content interaction information, a content adaptation to the device.

Aspect 71. The apparatus of Aspect 70, wherein the content adaptation is obtained by the aggregate adaptation engine from a particular device of the one or more additional devices, and wherein based on comparing the first content interaction information and the second content interaction information, the aggregate adaptation engine determines an association between a first user of the device and a second user of the particular device of the one or more additional devices.

Aspect 72. The apparatus of any of Aspects 70 to 71, wherein the second content interaction information comprises an aggregation of content interaction information obtained by the aggregate adaptation engine from the one or more additional devices.

Aspect 73. A computer readable medium comprising instructions using a computer system. The computer includes a memory (e.g., implemented in circuitry) and a processor (or multiple processors) coupled to the memory.

The processor (or processors) is configured to execute the computer readable medium and cause the processor to: obtain, by an aggregate adaptation engine, from a device, first content interaction information; compare the first content interaction information and a second content interaction information, wherein the second content interaction information is obtained from one or more additional devices, different from the device; and output, based on comparing the first content interaction information and the second content interaction information, a content adaptation to the device.

Aspect 74. The computer readable medium of Aspect 73, wherein the content adaptation is obtained by the aggregate adaptation engine from a particular device of the one or more additional devices, and wherein based on comparing the first content interaction information and the second content interaction information, the aggregate adaptation engine determines an association between a first user of the device and a second user of the particular device of the one or more additional devices.

Aspect 75. The computer readable medium of any of Aspects 73 to 74, wherein the second content interaction information comprises an aggregation of content interaction information obtained by the aggregate adaptation engine from the one or more additional devices.

Aspect 76: A non-transitory computer-readable storage medium having stored thereon instructions which, when executed by one or more processors, cause the one or more processors to perform any of the operations of aspects 1 to 66.

Aspect 77: An apparatus comprising means for performing any of the operations of aspects 1 to 66.

Aspect 78: A non-transitory computer-readable storage medium having stored thereon instructions which, when executed by one or more processors, cause the one or more processors to perform any of the operations of aspects 67 to 75.

Aspect 79: An apparatus comprising means for performing any of the operations of aspects 67 to 75.

Aspect 80: A method comprising operations according to any of Aspects 1 to 66 and any of Aspects 67 to 75.

Aspect 81: An apparatus for adapting digital content. The apparatus includes a memory (e.g., implemented in circuitry) and at least one processor (e.g., one processor or multiple processors) coupled to the memory. The at least one processor is configured to perform operations according to any of Aspects 1 to 66 and any of Aspects 67 to 75.

Aspect 82: A computer-readable storage medium storing instructions that, when executed by one or more processors, cause the one or more processors to perform operations according to any of Aspects 1 to 66 and any of Aspects 67 to 75.

Aspect 83: An apparatus comprising means for performing operations according to any of Aspects 1 to 66 and any of Aspects 67 to 75.

What is claimed is:

1. A method of adapting digital content, the method comprising:

obtaining a digital content comprising a default sequence for outputting the digital content to a device;

outputting, by the device, the digital content in accordance with the default sequence;

obtaining, from a monitoring engine, concurrent with outputting, by the device, the digital content in accordance with the default sequence, content interaction information associated with one or more interactions between one or more users of the device and the digital content; and outputting, based on the content interaction information, a content adaptation for the digital content, wherein the content adaptation for the digital content comprises an altered sequence for outputting the digital content, the altered sequence being different from the default sequence.

2. The method of claim 1, further comprising:

obtaining, by a plurality of devices, the digital content having a default configuration for outputting the digital content by the plurality of devices;

obtaining, from the plurality of devices, a plurality of content adaptations and a plurality of content interaction information associated with the digital content, wherein each content adaptation of the plurality of content adaptations is associated with one or more content interaction information of the plurality of content interaction information;

generating, based on the plurality of content adaptations obtained from the plurality of devices, an adapted digital content, wherein the adapted digital content comprises at least one content adaptation; and outputting the adapted digital content.

3. The method of claim 2, wherein outputting the adapted digital content comprises replacing the default configuration for outputting the digital content with an adapted configuration for outputting the digital content.

4. The method of claim 2, wherein generating the adapted digital content comprises:

categorizing the plurality of content adaptations into a plurality of content adaptation categories;

obtaining a plurality of statistical measures, wherein each statistical measure is associated with a corresponding content adaptation category of the plurality of content adaptation categories;

determining, for a particular statistical measure of the plurality of statistical measures, that the particular statistical measure exceeds a content adaptation category threshold; and generating, for one or more content adaptations of the plurality of content adaptations that corresponds to the particular statistical measure of the plurality of statistical measures determined to exceed the content adaptation category threshold, a content adaptation contribution to the adapted digital content.

5. The method of claim 4, further comprising determining, for an additional particular statistical measure of the plurality of statistical measures, that the additional particular statistical measure exceeds the content adaptation category threshold.

6. The method of claim 2, wherein the adapted digital content is configured to cause a device to output the at least one content adaptation based on obtaining, by the device, an additional content interaction information associated with the at least one content adaptation.

7. The method of claim 2, wherein generating the content adaptation comprises generating the altered sequence.

8. The method of claim 1, further comprising:

obtaining, from the monitoring engine, subsequent to outputting the content adaptation, additional content interaction information associated with the one or more users of the device and the digital content;

determining, based on the additional content interaction information, that outputting the digital content can be restored to the default sequence; and outputting, by the device, the digital content based on the default sequence.

9. The method of claim 8, further comprising determining, based on a duration of the content adaptation, a sequence position in the default sequence for outputting the digital content, wherein outputting, by the device, the digital content based on the default sequence comprises resuming default sequence for outputting the digital content at the sequence position in the default sequence.

10. The method of claim 9, further comprising, determining a portion of the digital content that was not output by the device during the content adaptation;

generating a summary of the portion of the digital content that was not output by the device during the content adaptation; and outputting, by the device, the summary of the portion of the digital content that was not output by the device during the content adaptation.

11. The method of claim 1, wherein generating the content adaptation comprises generating, based on the digital content and the content interaction information, additional digital content for adapting the digital content.

12. The method of claim 11, wherein the additional digital content is generated by a generative neural network.

13. The method of claim 12, wherein generating the content adaptation comprises:

processing one or more of the content interaction information or the digital content by a natural language understanding (NLU) neural network to generate a content generation prompt; and generating the additional digital content by the generative neural network.

14. The method of claim 12, wherein the generative neural network comprises one or more of a natural language processing (NLP) model, an image processing model, an audio processing model, or a multi-modal model.

15. The method of claim 1, wherein the content interaction information comprises one or more of monitoring for asked questions, sentiment analysis, note taking by a user of a device, expression detection, emotion detection, eye tracking, heart-rate monitoring, body temperature monitoring, a response to a query, or a user input.

16. The method of claim 1, further comprising:

obtaining additional content interaction information associated with outputting an additional digital content, different from the digital content, to a user of the device, wherein the content interaction information is associated with outputting the digital content to the user of the device; and comparing the additional content interaction information to the content interaction information.

17. The method of claim 16, further comprising:

determining that a first user engagement level associated with the content interaction information is less than a second user engagement level associated with the additional content interaction information; and based on determining that the first user engagement level is less than the second user engagement level, generating the content adaptation.

18. The method of claim 1, further comprising outputting the content adaptation and the content interaction information to an aggregate adaptation engine.

19. The method of claim 1, further comprising:

outputting the content interaction information to an adaptation aggregation engine; and obtaining, based on the content interaction information, an additional content adaptation.

20. The method of claim 1, further comprising:

determining a duration of the content adaptation for the digital content;

determining, based on the duration of the content adaptation for the digital content, a sequence position in the default sequence for outputting the digital content; and resuming the default sequence for outputting the digital content at the sequence position.

21. The method of claim 1, wherein the one or more interactions between the one or more users of the device and the digital content comprises a question regarding the digital content and wherein the content adaptation comprises a response to the question.

22. The method of claim 1, further comprising:

generating a query based on the content interaction information;

transmitting the query; and obtaining the content adaptation based on the query.

23. An apparatus for adapting digital content, comprising:

at least one memory; and at least one processor coupled to the at least one memory and configured to:

obtain a digital content comprising a default sequence for outputting the digital content to a device;

output, by the device, the digital content in accordance with the default sequence;

obtain, from a monitoring engine, concurrent with outputting, by the device, the digital content in accordance with the default sequence, content interaction information associated with one or more interactions between one or more users of the device and the digital content; and generate, based on the content interaction information, a content adaptation for the digital content, wherein the content adaptation for the digital content comprises an altered sequence for outputting the digital content, the altered sequence being different from the default sequence.

24. The apparatus of claim 23, the at least one processor configured to:

obtain, by a plurality of devices, the digital content having a default configuration for outputting the digital content by the plurality of devices;

obtain, from the plurality of devices, a plurality of content adaptations and a plurality of content interaction information associated with the digital content, wherein each content adaptation of the plurality of content adaptations is associated with one or more content interaction information of the plurality of content interaction information;

generate, based on the plurality of content adaptations obtained from the plurality of devices, an adapted digital content, wherein the adapted digital content comprises at least one content adaptation; and output the adapted digital content.

25. The apparatus of claim 24, wherein the at least one processor is configured to:

categorize the plurality of content adaptations into a plurality of content adaptation categories;

obtain a plurality of statistical measures, wherein each statistical measure is associated with a corresponding content adaptation category of the plurality of content adaptation categories;

determine, for a particular statistical measure of the plurality of statistical measures, that the particular statistical measure exceeds a content adaptation category threshold; and generate, for one or more content adaptations of the plurality of content adaptations that corresponds to the particular statistical measure of the plurality of statistical measures determined to exceed the content adaptation category threshold, a content adaptation contribution to the adapted digital content.

26. The apparatus of claim 25, wherein the at least one processor is configured to: for an additional particular statistical measure of the plurality of statistical measures, determine that the additional particular statistical measure exceeds the content adaptation category threshold.

27. The apparatus of claim 23, the at least one processor further configured to:

determine a duration of the content adaptation for the digital content;

determine, based on the duration of the content adaptation for the digital content, a sequence position in the default sequence for outputting the digital content; and resume the default sequence for outputting the digital content at the sequence position.

28. The apparatus of claim 23, wherein the one or more interactions between the one or more users of the device and the digital content comprises a question regarding the digital content and wherein the content adaptation comprises a response to the question.

29. The apparatus of claim 23, the at least one processor further configured to:

generate a query based on the content interaction information;

transmit the query; and obtain the content adaptation based on the query.

30. A non-transitory computer readable medium comprising instructions, the instructions, when executed by a computing system, cause the computing system to:

obtain a digital content comprising a default sequence for outputting the digital content to a device;

output, by the device, the digital content in accordance with the default sequence;

obtain, from a monitoring engine, concurrent with outputting, by the device, the digital content in accordance with the default sequence, content interaction information associated with one or more interactions between one or more users of the device and the digital content; and generate, based on the content interaction information, a content adaptation for the digital content, wherein the content adaptation for the digital content comprises an altered sequence for outputting the digital content, the altered sequence being different from the default sequence.

* * * * *